US012537335B2

(12) United States Patent
Ito et al.

(10) Patent No.: US 12,537,335 B2
(45) Date of Patent: Jan. 27, 2026

(54) CONNECTOR

(71) Applicant: Yamaichi Electronics Co., Ltd., Tokyo (JP)

(72) Inventors: Toshiyasu Ito, Tokyo (JP); Yosuke Takai, Tokyo (JP); Masaaki Saito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 368 days.

(21) Appl. No.: 18/102,971

(22) Filed: Jan. 30, 2023

(65) Prior Publication Data

US 2024/0258736 A1 Aug. 1, 2024

(51) Int. Cl.
*H01R 13/502* (2006.01)
*H01R 13/40* (2006.01)
*H01R 24/60* (2011.01)

(52) U.S. Cl.
CPC ........... *H01R 13/502* (2013.01); *H01R 13/40* (2013.01); *H01R 24/60* (2013.01)

(58) Field of Classification Search
CPC ...... H01R 13/502; H01R 13/40; H01R 24/60; H01R 12/724; H01R 13/6474; H01R 12/721; H01R 12/737; H01R 13/6477; H01R 13/6473; H01R 12/7011; H01R 13/04; H01R 13/652
See application file for complete search history.

(56) References Cited

U.S. PATENT DOCUMENTS

| | | | | |
|---|---|---|---|---|
| 7,014,475 B1 * | 3/2006 | Mongold | ............ | H01R 12/721 439/67 |
| 9,780,512 B2 | 10/2017 | Hsu et al. | | |
| 10,541,482 B2 | 1/2020 | Sasame | | |
| 2015/0255935 A1 * | 9/2015 | Sunaga | .................. | H01R 24/60 439/676 |
| 2019/0214753 A1 | 7/2019 | Jiang et al. | | |
| 2021/0203104 A1 | 7/2021 | Chen | | |
| 2021/0328369 A1 | 10/2021 | Wu et al. | | |
| 2021/0399484 A1 * | 12/2021 | Mongold | ............ | H01R 13/514 |
| 2024/0106170 A1 | 3/2024 | Tsai | | |

(Continued)

FOREIGN PATENT DOCUMENTS

| | | |
|---|---|---|
| CN | 103779692 A | 5/2014 |
| CN | 206727340 U * | 12/2017 |
| CN | 209266612 U | 8/2019 |

(Continued)

OTHER PUBLICATIONS

Extended European Search Report issued on Sep. 2, 2024, in EP Application No. 23214932.8.

*Primary Examiner* — Abdullah A Riyami
*Assistant Examiner* — Nader J Alhawamdeh
(74) *Attorney, Agent, or Firm* — Panitch Schwarze Belisario & Nadel LLP

(57) ABSTRACT

An embodiment includes a main body holding pin groups and partition walls partitioning adjacent signal pins from each other, each of the signal pins has a fixing part located on a mount part side and fixed to a substrate, tip parts located on an insertion-extraction part side and serving as a free end, and a contact part provided between the fixing part and the tip parts and configured to be in electrical contact with electrodes of a device, and the adjacent tip parts are located via an opening.

15 Claims, 40 Drawing Sheets

(56) References Cited

U.S. PATENT DOCUMENTS

| | | | | |
|---|---|---|---|---|
| 2024/0186733 | A1* | 6/2024 | Sato | H01R 12/735 |
| 2024/0258736 | A1* | 8/2024 | Ito | H01R 13/40 |

FOREIGN PATENT DOCUMENTS

| | | | |
|---|---|---|---|
| CN | 110311242 | B | 10/2020 |
| CN | 111029828 | B | 4/2021 |
| CN | 115548793 | A | 12/2022 |
| JP | 2011146210 | A | 7/2011 |

* cited by examiner

CONNECTOR

BACKGROUND

1. Technical Field

The present invention relates to a connector.

2. Description of Related Art

The widespread use of the 5th generation mobile communication system (5G), big data, artificial intelligence (AI), IoT, and the like require faster and more stable communication for an increasing amount of data on the cloud.

For example, a large number of receptacle connectors mounted on a substrate have been used in data center devices in order to implement high-frequency communication. A receptacle connector has a plurality of pin groups each having a plurality of contact pins and a housing holding these pin groups. For example, a first pin group and a second pin group are arranged so as to face each other with a predetermined spacing therebetween and are configured such that, when a plug connector is connected to a receptacle connector, the plug connector substrate is inserted between the first pin group and the second pin group (for example, as in U.S. Pat. No. 9,780,512 and Japanese Patent Application Laid-Open No. 2011-146210).

When a substrate is inserted, a movable piece of each contact pin of the first pin group and a movable piece of each contact pin of the second pin group come into contact with the substrate and are thereby deformed in a direction away from each other to be in a connected state.

BRIEF SUMMARY

There is a demand for a technology to realize a higher speed and a higher density to achieve 112 Gbps transmission or 224 Gbps transmission for data center devices or the like. Further, receptacle connectors mounted on substrates of data center devices or the like are required to ensure good signal transmission characteristics resulted from improvement on impedance characteristics in a high frequency region above 80 GHz.

Accordingly, the present invention intends to provide a connector that can improve impedance characteristics.

The connector according to one aspect of the present invention includes: a mount part mounted on an external substrate; an insertion-extraction part in and from which an external device is inserted and extracted in an insertion-extraction direction: a pin group in which a plurality of contact pins configured to be in electrical contact with electrodes of the device are aligned: a housing that holds the pin group; and a partition wall that partitions adjacent contact pins from each other. Each of the contact pins has a fixing part located on a mount part side and fixed to the substrate, a tip part located on an insertion-extraction part side and serving as a free end, and a contact part provided between the fixing part and the tip part and configured to be in electrical contact with each of the electrodes of the device. In a state where the contact part is in contact with each of the electrodes of the device, adjacent tip parts are located via a space where the partition wall is absent.

A partition wall is provided between adjacent contact pins. On the other hand, in a state where the contact parts are in contact with the electrodes of the device, a space where no partition wall is present is provided between the tip parts of the adjacent contact pins. Accordingly, the dielectric constant between the tip parts can be smaller than a case where a material object made of a resin or the like such as the partition wall is interposed between the tip parts of the contact pins. This can improve the impedance characteristics of the connector.

Note that the partition wall may be provided between the contact pins in a region on the mount part side from the tip parts.

In the connector according to one aspect of the present invention, the space is formed of an opening formed in the partition wall.

An opening is formed in the partition wall to form the space between the tip parts of the adjacent contact pins. Accordingly, the space can be formed with a simple configuration.

In the connector according to one aspect of the present invention, the partition wall includes a connecting part provided such that a wall end part serving as a free end of the partition wall is formed continuously in a longitudinal direction, and a perimeter of the opening is closed by the connecting part.

A connecting part is provided so that the wall end part serving as the free end of the partition wall is continuous in the longitudinal direction. Because of such a connecting part, the opening has a shape with a closed perimeter. The connecting part is provided such that the wall end part of the partition wall is continuous in the longitudinal direction, and thus the strength of the partition wall can be enhanced.

In the connector according to one aspect of the present invention, the transmission rate is 100 Gbps or higher.

In a case of high-speed transmission in which the transmission rate is 100 Gbps or higher, improvement in impedance characteristics is effective in particular.

The connector according to one aspect of the present invention includes: a mount part mounted on an external substrate; an insertion-extraction part in and from which an external device is inserted and extracted in an insertion-extraction direction: a pin group in which a plurality of contact pins configured to be in electrical contact with electrodes of the device are aligned; and a resin housing that holds the pin group. Each of the contact pins has a press-fit part, the press-fit part has a shape formed such that an elongate plate-like member extending in a longitudinal direction is bent at a plurality of points, and the press-fit part is press-fitted into and secured in the housing. The press-fit part has a protruding part, the protruding part protrudes from a main body of the press-fit part outwardly in a width direction orthogonal to a plate-thickness direction and the longitudinal direction of the contact pins, and the protruding part is in contact with and press-fitted into the housing. In the housing, a space is formed so as to form a noncontact region in which a planar part in the width direction of the press-fit part is not in contact with the housing at a position corresponding to the protruding part. The planar part of the press-fit part is in contact with the housing in a region other than the noncontact region.

The protruding part having a large dimension in the width direction of the contact pin has a larger volume of a conductor portion than the main body having a smaller dimension in the width direction than the protruding part and thus has a reduced impedance. On the other hand, a portion where the contact pin is in contact with the resin housing has a reduced impedance. Taking advantage of this property, a space is provided in a housing to form a noncontact region so that a planar part of the contact pin corresponding to the protruding part having a large dimension in the width direction is not in contact with the resin, while in a region other than the noncontact region, the planar part of the contact pin is configured to be in contact with the resin housing. Accordingly, it is possible to control an impedance change in the longitudinal direction of the press-fit part of the contact pin as much as possible.

Note that the space formed in the housing only needs to be provided at the position corresponding to the signal pin, which is configured to transmit a signal, out of the contact pins and does not need to be provided at the position corresponding to the ground pin to be grounded.

In the connector according to one aspect of the present invention, the pin group includes a first pin group and a second pin group facing the first pin group, the press-fit part of each of the contact pins of the first pin group has a larger dimension in the longitudinal direction than the press-fit part of each of the contact pins of the second pin group, and the noncontact region is provided at a position corresponding to the protruding part of the press-fit part of the first pin group.

The contact pin of the second pin group having a small dimension in the longitudinal direction of the press-fit part has a relatively smaller effect of the noncontact region being provided than the contact pin of the first pin group having a large dimension in the longitudinal direction of the press-fit part. Therefore, the noncontact region is provided at at least a position corresponding to the protruding part of the contact pin of the first pin group having a large dimension in the longitudinal direction of the press-fit part. Preferably, the noncontact region is not provided at a position corresponding to the protruding part of the contact pin of the second pin group. Accordingly, it is only required to perform machining for providing the noncontact region to only the housing corresponding to the first pin group, and this can reduce the manufacturing cost.

In the connector according to one aspect of the present invention, the contact pin includes, between the protruding part and the main body, a narrow-width part having a smaller dimension in the width direction than the protruding part and the main body.

A narrow-width part is provided between the protruding part and the main body to compensate a reduction in the impedance of the protruding part by using the narrow-width part having a smaller volume of a conductor than the protruding part. Accordingly, it is possible to control an impedance change of the entire contact pin as much as possible and obtain a desired impedance.

In the connector according to one aspect of the present invention, the contact pins include a signal pin configured to transmit a signal and a ground pin to be grounded, and a position of the protruding part of the signal pin is a position that differs in the longitudinal direction from a position of the protruding part of the ground pin adjacent to the signal pin.

The position of the protruding part of the signal pin is set at a different position in the longitudinal direction from the position of the protruding part of the adjacent ground pin. The positions of the protruding part are shifted from each other in the longitudinal direction in such a way, and thereby a large change in the spacing between the signal pin and the ground pin can be avoided. This facilitates adjustment of the impedance.

The connector according to one aspect of the present invention includes: a mount part mounted on an external substrate: an insertion-extraction part in and from which an external device is inserted and extracted in an insertion-extraction direction: a pin group in which a plurality of contact pins configured to be in electrical contact with electrodes of the device are aligned; a housing that holds the pin group; and a conductive member being in electrical contact with ground pins to be grounded of the contact pins of the pin group and extending in an alignment direction of the contact pins of the pin group. Each of the ground pins includes, as the mount part, a substrate fixing part to be fixed to the substrate. The substrate fixing part has a fixing face to be fixed to the substrate and a back face on the opposite side in a plate-thickness direction to the fixing face. The conductive member is held between the back face of the ground pins and the housing.

The conductive member can reduce noise by being in electrical contact with each ground pin of the contact pins. Each conductive member is provided so as to be held between the back face of the substrate fixing part of the ground pin and the housing. This allows for effective utilization of a region on the back face sides of the substrate fixing part of the ground pin, and the connector can be made compact.

As the conductive member, the conductive resin can be used, for example.

In the connector according to one aspect of the present invention, the conductive member includes a main body and a first protrusion part erected from the main body toward the substrate fixing part of the ground pins and being in electrical contact with the back face.

The first protrusion part erected from the main body of the conductive member toward the substrate fixing part of the ground pin is provided and configured so that the first protrusion part is in electrical contact with the back face of the ground pin, and thus contact of the conductive member with the signal pin can be reliably avoided.

In the connector according to one aspect of the present invention, each of the ground pins has a base end part bent and connected to the substrate fixing part, and the conductive member includes a second protrusion part erected toward a base end part side and being in electrical contact with the base end part.

The second protrusion part protrudes to the base end part of the conductive member, and this allows for a wider area of electrical contact with the ground pins and therefore enables effective noise absorbance.

The connector according to one aspect of the present invention includes: a mount part mounted on an external substrate: an insertion-extraction part in and from which an external device is inserted and extracted in an insertion-extraction direction: a pin group in which a plurality of contact pins configured to be in electrical contact with electrodes of the device are aligned; and a housing that holds the pin group. Each of the contact pins has a press-fit part, a contact part, and an intermediate part located between the press-fit part and the contact part, the press-fit part has a shape formed such that an elongate plate-like member extending in a longitudinal direction is bent at a plurality of points, the press-fit part is press-fitted into and secured in the housing, and the contact part is located on an insertion-extraction part side and configured to be in electrical contact with the electrodes of the device. In the housing, slits opened to outside of the housing are each formed at a position corresponding to the intermediate part.

The slits opened to outside of the housing are formed in the housing at positions corresponding to the intermediate parts of the contact pins, and thereby crosstalk during transmission of a high-speed signal above 100 Gbps can be improved.

In the connector according to one aspect of the present invention, the contact pins include a signal pin configured to transmit a signal and a ground pin to be grounded, and one slit is provided at each of positions corresponding to the signal pin and the ground pin.

Each single slit may be provided at each of the positions corresponding to the signal pins and the ground pins. Note that no slit is provided at a position corresponding to a power supply pin used for supplying power.

In the connector according to one aspect of the present invention, the contact pins include a signal pin configured to transmit a signal and a ground pin to be grounded, and one slit is provided at each of positions corresponding to the signal pin and no slit is formed at a position corresponding to the ground pin.

Each single slit may be provided at each of the signal pins, and no slit may be provided at the position corresponding to the ground pins. In such a case, no slit is provided at a position corresponding to a power supply pin used for supplying power.

In the connector according to one aspect of the present invention, the contact pins include signal pins configured to transmit signals and ground pins to be grounded and are aligned such that one ground pin is arranged each on both sides of a pair of adjacent two signal pins in parallel, and one slit is provided at a position corresponding to the two signal pins.

Each single slit is provided at a position corresponding to a pair of two adjacent signal pins to integrate the slits, and thereby the number of slits can be reduced.

DETAILED DESCRIPTION

First Embodiment

A connector according to a first embodiment of the present invention will be described with reference to the drawings.

Note that an insertion-extraction direction Die, a width direction Dw, and a height direction Dh used in the following description are the names based on the orientation in FIG. 1, but they are not intended to limit the orientation in a system in actual usage.

Figure 1:
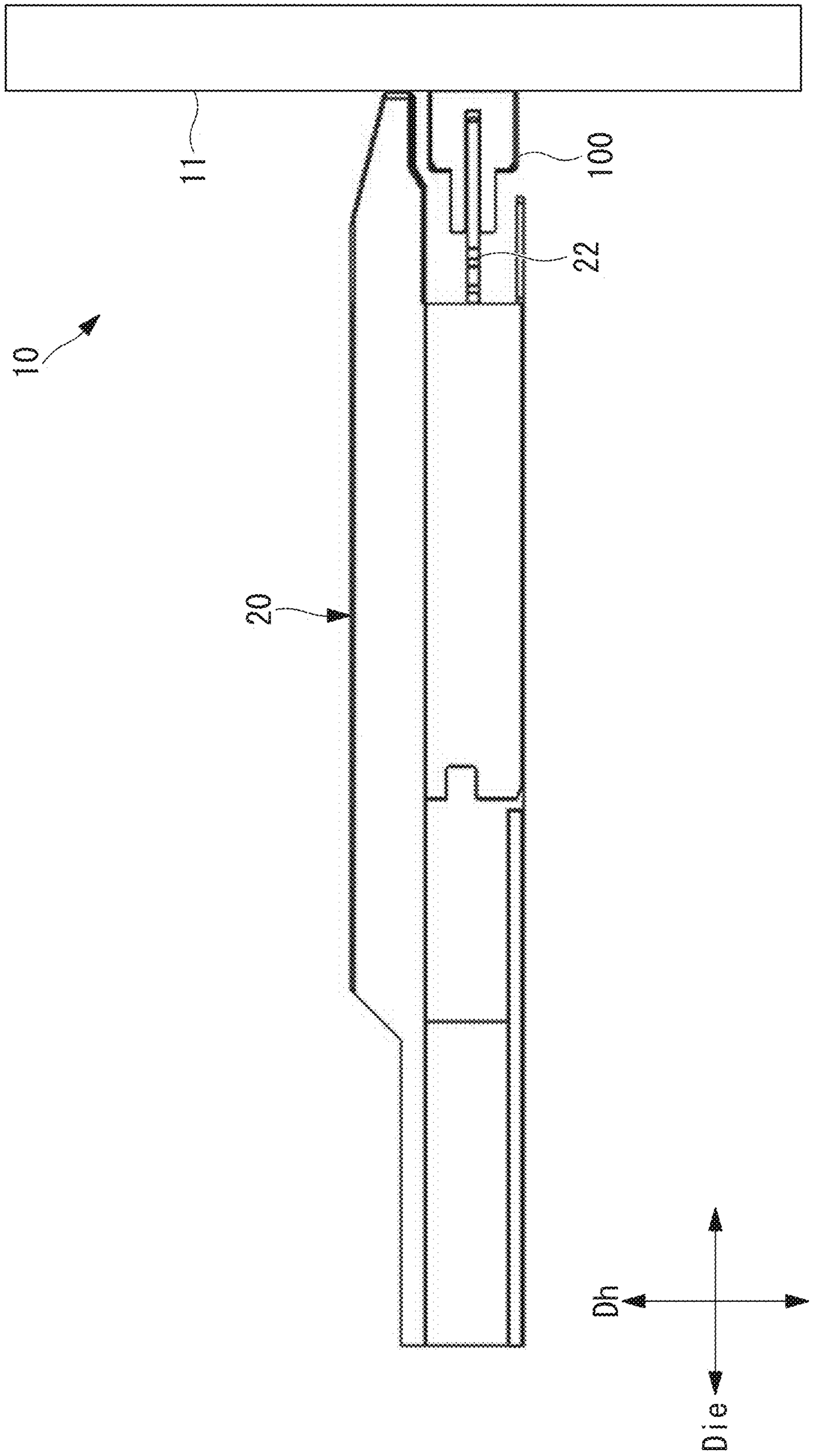
FIG. 1 is a schematic diagram of a communication system.

As illustrated in FIG. 1, a connector 100 of the present embodiment is a receptacle connector mounted on a mount substrate (a substrate) 11 of a communication system 10 of a data center or the like and connected to a pluggable module 20. The connector 100 is suitable for use in a high-speed transmission of 100 Gbps or higher.

The pluggable module 20 is an optical transceiver such as OSFP or OSFP-XD, for example. The pluggable module 20 has a substrate (a pluggable device) 22. The tip of the pluggable substrate 22 is inserted in the connector 100 mounted on the mount substrate 11. The pluggable substrate 22 is inserted in and extracted from the connector 100 by moving the pluggable module 20 in the insertion-extraction direction Die.

<Connector 100>

Figure 2:
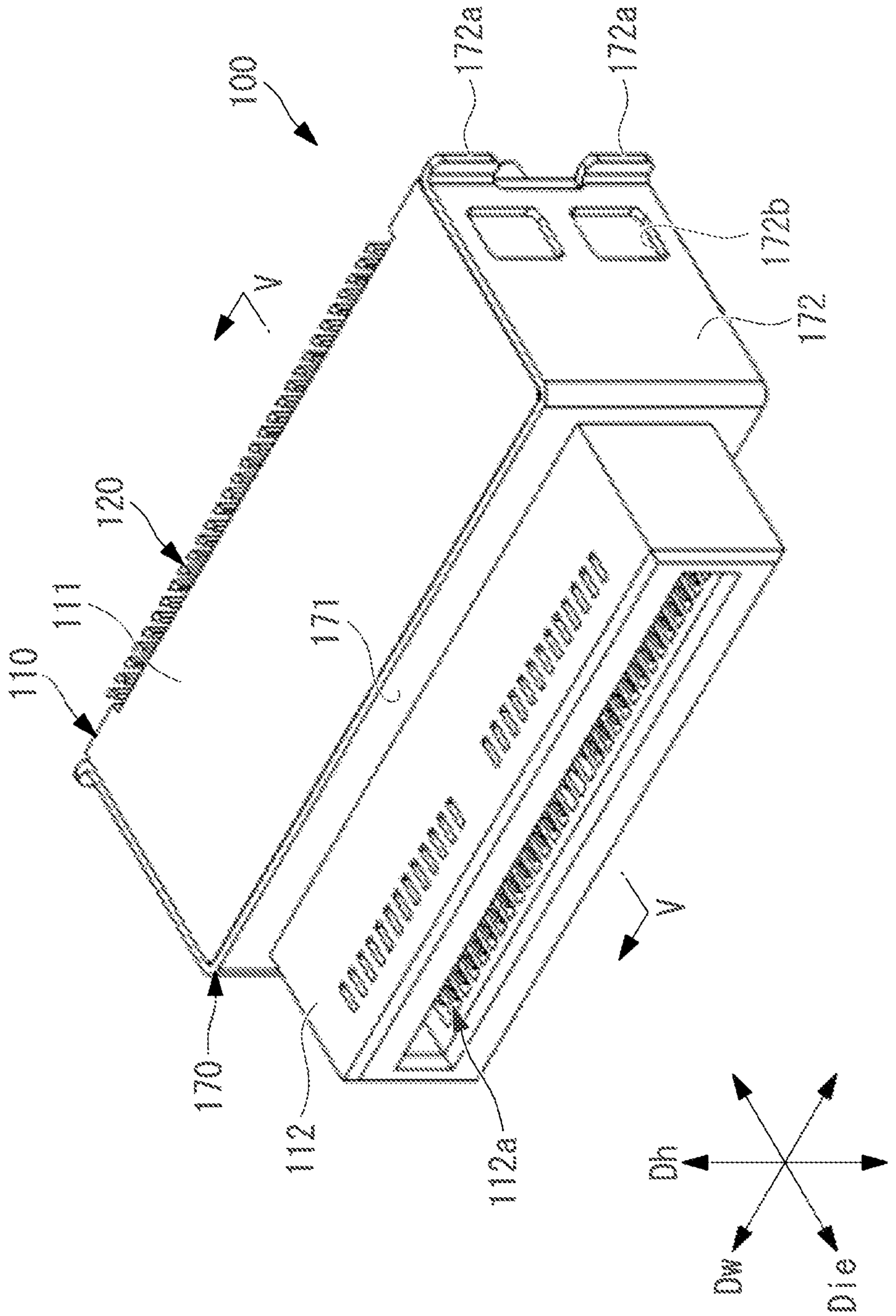
FIG. 2 is a perspective view of a connector according to a first embodiment.
Figure 3:
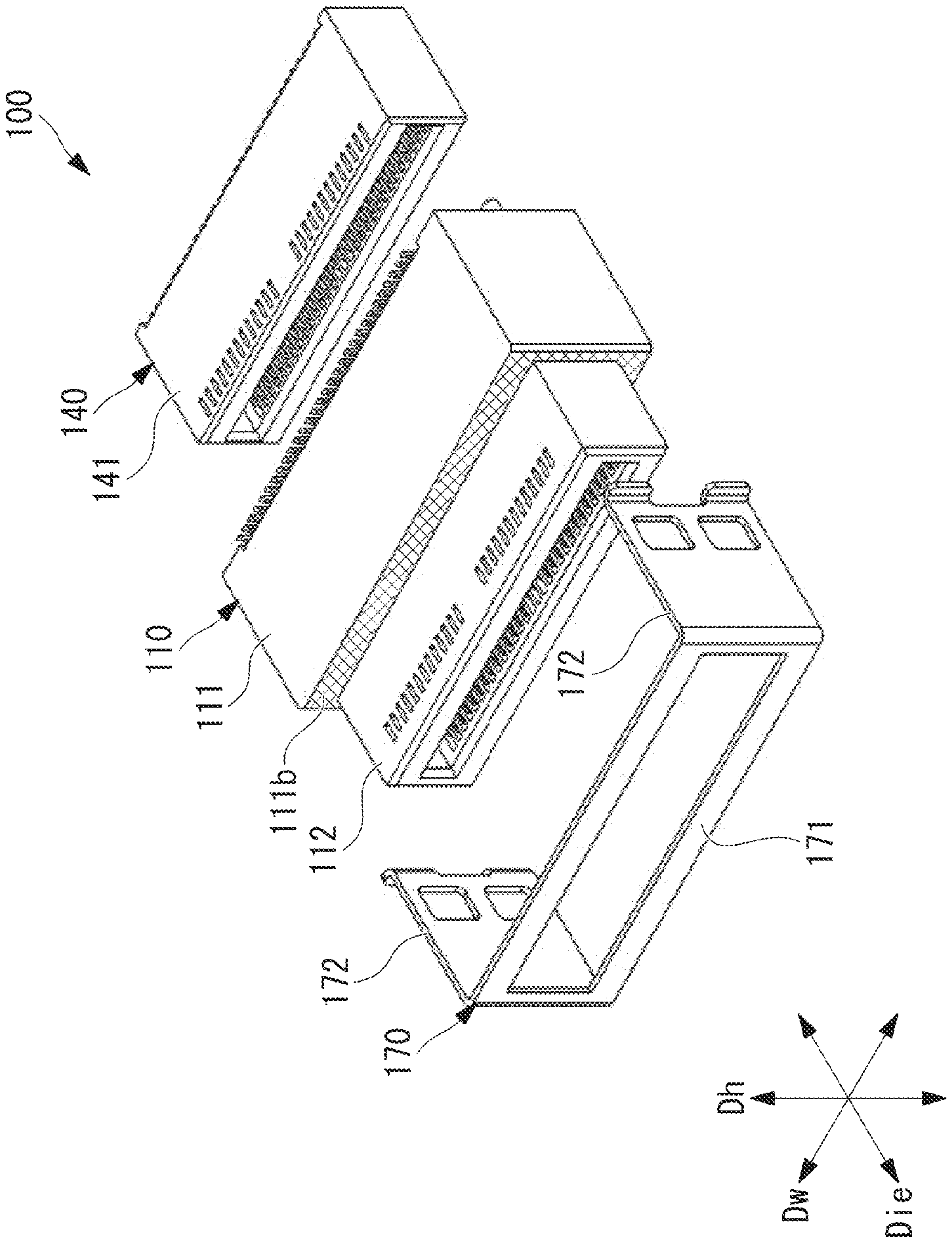
FIG. 3 is an exploded perspective view of the connector according to the first embodiment.
Figure 4:
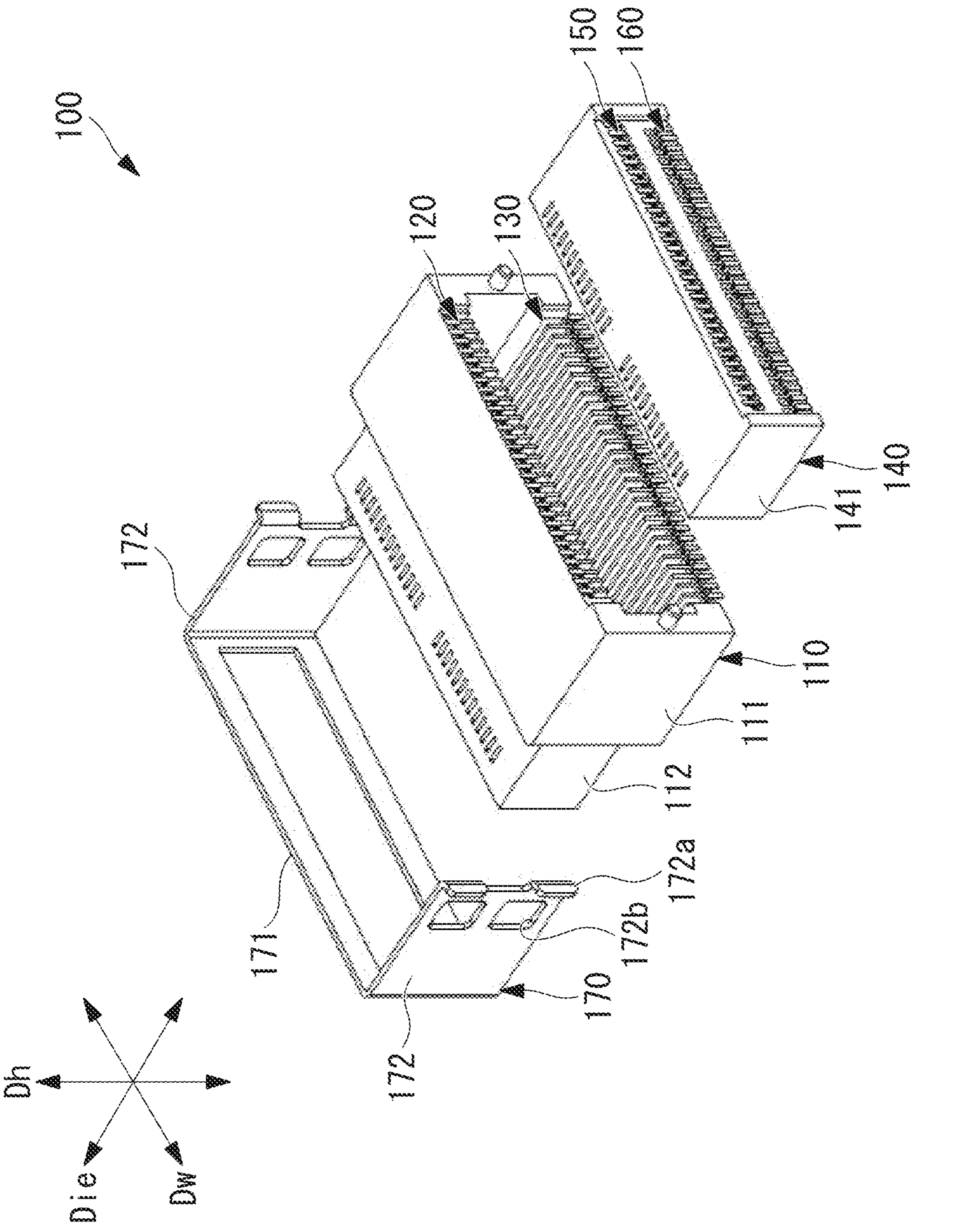
FIG. 4 is an exploded perspective view of the connector according to the first embodiment.

As illustrated in FIG. 2 to FIG. 4, the connector 100 includes an outer housing 110, a first pin group 120, a second pin group 130, an inner housing 140, a third pin group 150, a fourth pin group 160, and a reinforcing member 170. Each of the pin groups 120, 130, 150, 160 includes signal pins through which signals are transmitted, ground pins to be grounded, and power supply pins used for supplying power. The signal pins, through which a high-speed signal is transmitted, form a differential pair, for example, and the ground pins are provided to correspond to respective differential pairs.

Figure 5:
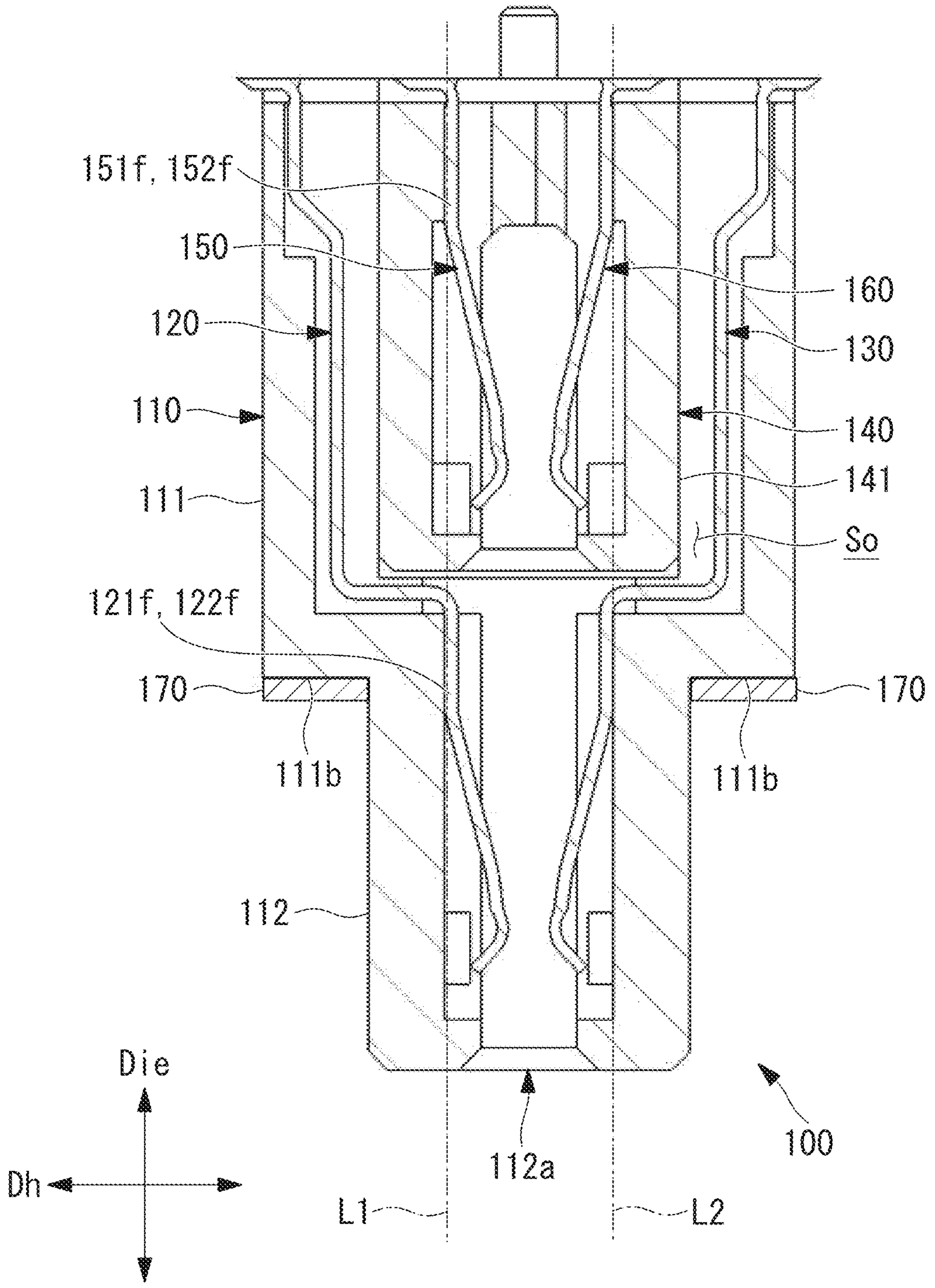
FIG. 5 is a cross sectional view taken along a cutting-plane line V-V illustrated in FIG. 2.

As illustrated in FIG. 5, the connector 100 has a two-stage configuration in which the inner housing 140 holding the third pin group 150 and the fourth pin group 160 is accommodated in the outer housing 110 holding the first pin group 120 and the second pin group 130.

<<Outer Housing>>

As illustrated in FIG. 3 and FIG. 4, the outer housing 110 is a nonconductive member and is molded with a resin or the like, for example. The outer housing 110 is a casing having a main body 111 and a protruding part 112 in which a slot opening 112*a* is formed and having a space So (see FIG. 5) defined therein.

The protruding amount of the protruding part 112 is about 5 mm to 6 mm, for example. However, the protruding amount is not limited to this numerical value and can be changed as appropriate in accordance with a specification.

As illustrated in FIG. 3, the surface of the main body 111 orthogonal to the insertion-extraction direction Die present around the protruding part 112 is defined as an installation surface 111*b*, and a frame part 171 of the reinforcing member 170 (see FIG. 5) is installed thereto. In FIG. 3, the installation surface 111*b* is illustrated by cross-hatching. The reinforcing member 170 has the frame part 171 and side parts 172. The reinforcing member 170 is made of a metal, for example.

Figure 6:
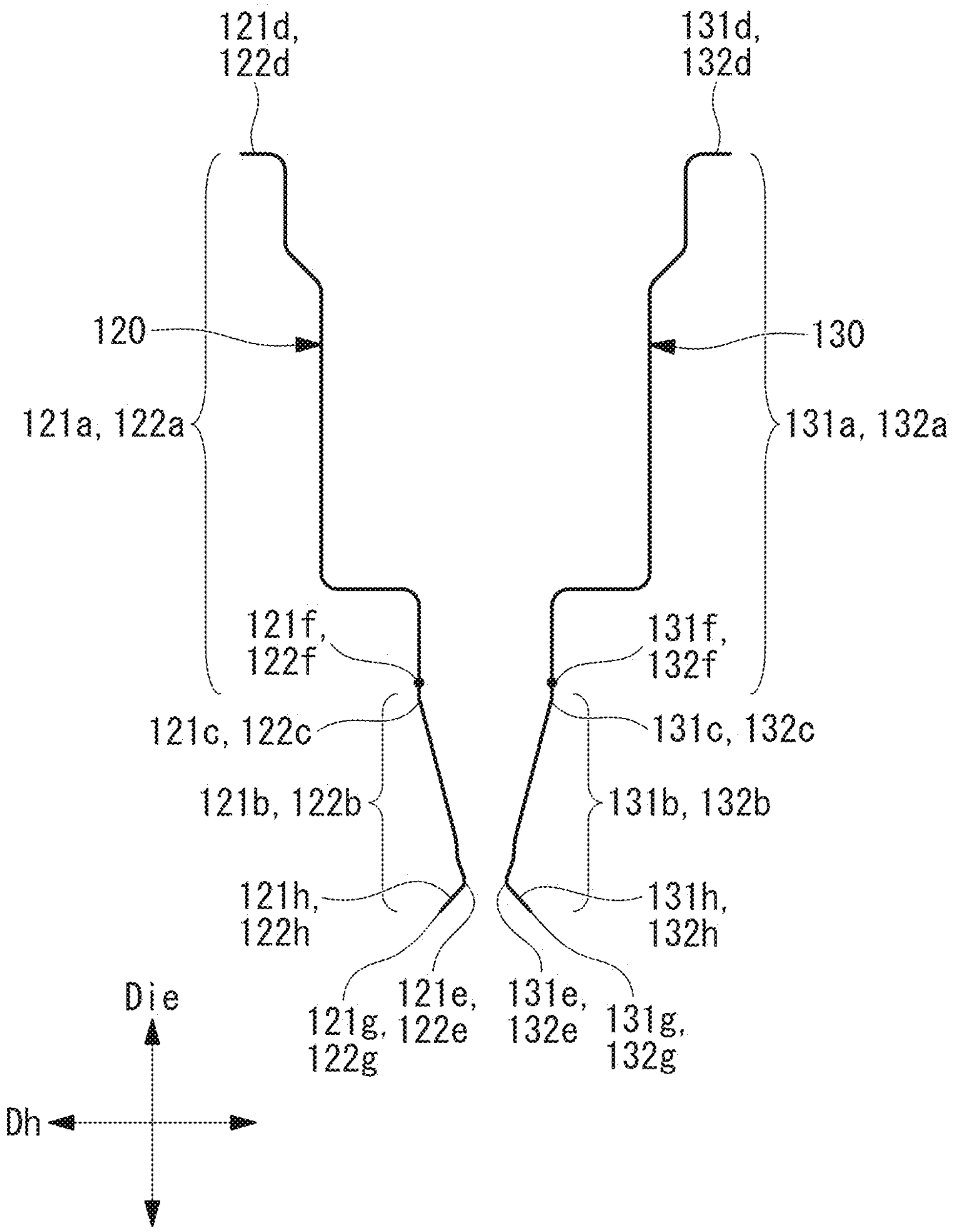
FIG. 6 is a side view of contact pins held by an outer housing.

For example, a signal pin 121 of the first pin group 120 of FIG. 5 is described as an example of a contact pin. The signal pin 121 is a conductive member to ensure conduction between the mount substrate 11 and the pluggable substrate 22 illustrated in FIG. 1 and has a stationary piece 121*a* and a movable piece 121*b* as illustrated in FIG. 6. The signal pin 121 has a shape formed such that an elongate metal plate-like member extending in the longitudinal direction is bent at a plurality of points.

The stationary piece 121*a* is a piece from the terminal end (pin base end) of a mount part (a fixing part) 121*d* to a press-fit fixing part 121*f* and includes the mount part 121*d* and the press-fit fixing part 121*f*.

The mount part 121*d* is a portion connected (soldered) to the mount substrate 11 and faces outside of the connector 100. Note that the mount part 121*d* may face inside.

Figure 7:
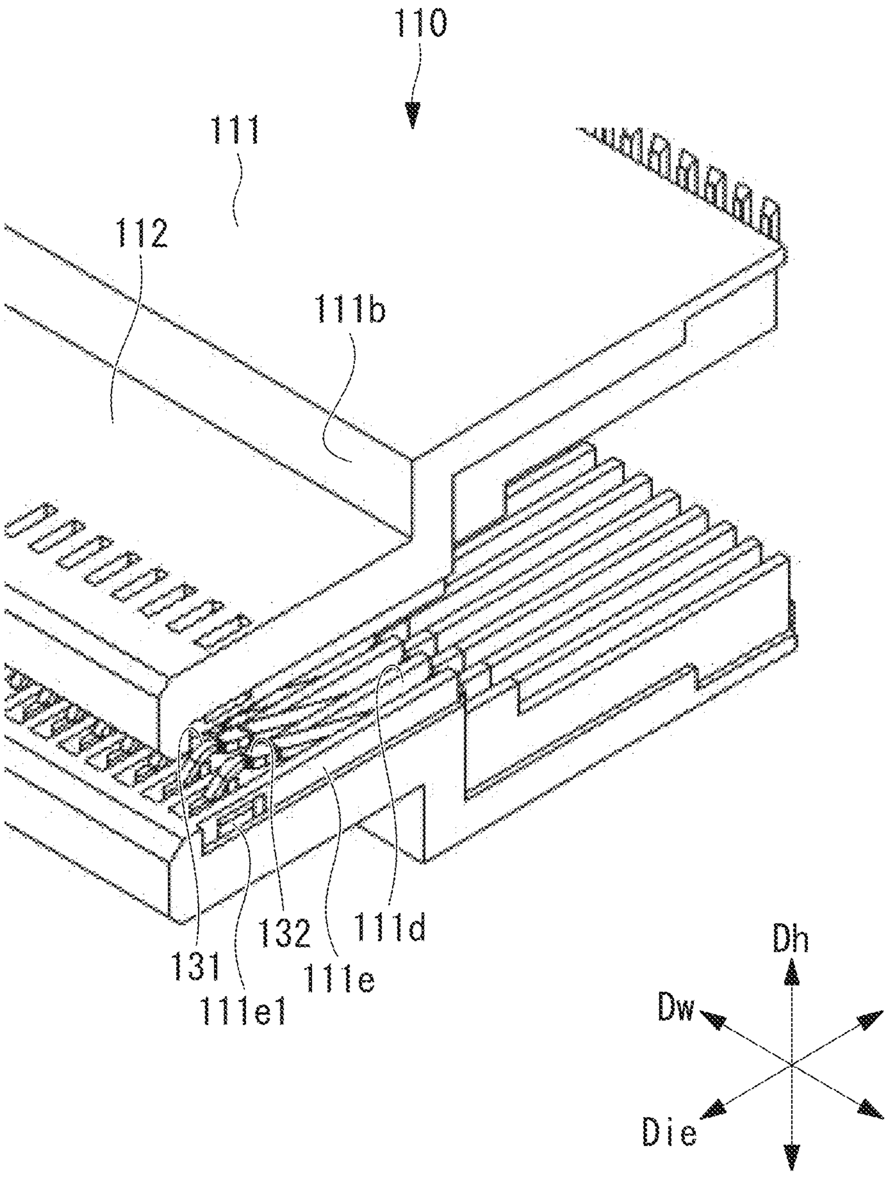
FIG. 7 is a sectional perspective view of the outer housing.

The press-fit fixing part 121*f* is a portion press-fitted in a groove 111*d* (see FIG. 7) formed in the inner wall of the main body 111. As illustrated in FIG. 7, each groove 111*d* is formed by partition walls 111*e* erected inwardly from the inner wall of the main body 111. The partition walls 111*e* extend in the longitudinal direction of signal pins 131 and ground pins 132 and are each provided so as to serve as a partition between each signal pin 131 and each ground pin 132. Accordingly, a plurality of grooves 111*d* (the number of which corresponds to the number of contact pins) each extending in the insertion-extraction direction Die are provided over the width direction Dw. A press-fit fixing part 131*f* (see FIG. 6) of a stationary piece 131*a* is press-fitted in the groove 111*d*, and thereby the signal pin 131 and the ground pin 132 are held by the outer housing 110.

In FIG. 6, the press-fit fixing part 121*f* is indicated by a black circle. The press-fit fixing part 121*f* is provided at a position closer to the mount part 121*d* than an inflection part 121*c* described later. The press-fit fixing part 121*f* is a protruding part formed in the stationary piece 121*a* and protruding in the width direction Dw, for example.

Note that the number of press-fit fixing parts 121*f* is not necessarily one, and a plurality of press-fit fixing parts 121*f* may be provided in a range of the signal pin 121 located closer to the mount part 121*d* than the inflection part 121*c*.

The movable piece 121*b* is a piece from the press-fit fixing part 121*f* to the tip (pin tip) 121*g* on a contact part 121*e* side and includes the inflection part 121*c* and the contact part 121*e*. A tip part 121*h* from the contact part 121*e* to the tip 121*g* is a free end bent outward at the contact part 121*e*.

Note that the above expression of a piece "from the press-fit fixing part 121*f*" in the description of the movable piece 121*b* means in detail that the piece does not include the press-fit fixing part 121*f* and starts from a portion closer to the pin tip adjacent to the press-fit fixing part 121*f*. Thus, the press-fit fixing part 121*f* is the boundary between the stationary piece 121*a* and the movable piece 121*b* and is included in the stationary piece 121*a*. Further, when a plurality of press-fit fixing parts 121*f* are present, the boundary between the stationary piece 121*a* and the movable piece 121*b* is defined as the press-fit fixing part 121*f* that is the closest to the pin tip.

The contact part 121*e* is a portion in contact with the pluggable substrate 22 and curved so as to be convex inward.

The unloaded movable piece 121*b* is inclined inward by the inflection part 121*c* and is deformed so as to be opened outward when the pluggable substrate 22 is inserted in the connector 100.

In the same manner as the signal pin 121 of the first pin group 120, the signal pin 131 of the second pin group has a stationary piece 131*a* including a mount part (a fixing part) 131*d* and a press-fit fixing part 131*f* and a movable piece 131*b* including an inflection part 131*c* and a contact part 131*e*. Further, a tip part 131*h* from the contact part 131*e* to the tip 131*g* is a free end bent outward at the contact part 131*e*.

In the same manner as the signal pin 121 of the first pin group 120, the ground pin 122 of the first pin group 120 has a stationary piece 122*a* including a mount part (a fixing part) 122*d* and a press-fit fixing part 122*f* and a movable piece 122*b* including an inflection part 122*c* and a contact part 122*e*. Further, a tip part 122*h* from the contact part 122*e* to the tip 122*g* is a free end bent outward at the contact part 122*e*.

In the same manner as the signal pin 121 of the first pin group 120, the ground pin 132 of the second pin group 130 has a stationary piece 132*a* including a mount part (a fixing part) 132*d* and a press-fit fixing part 132*f* and a movable piece 132*b* including an inflection part 132*c* and a contact part 132*e*. Further, a tip part 132*h* from the contact part 132*e* to the tip 132*g* is a free end bent outward at the contact part 132*e*.

<<Inner Housing>>

As illustrated in FIG. 3 and FIG. 4, the inner housing 140 is a casing having a main body 141. The inner housing 140 is a nonconductive member and is molded with a resin or the like, for example.

Figure 8:
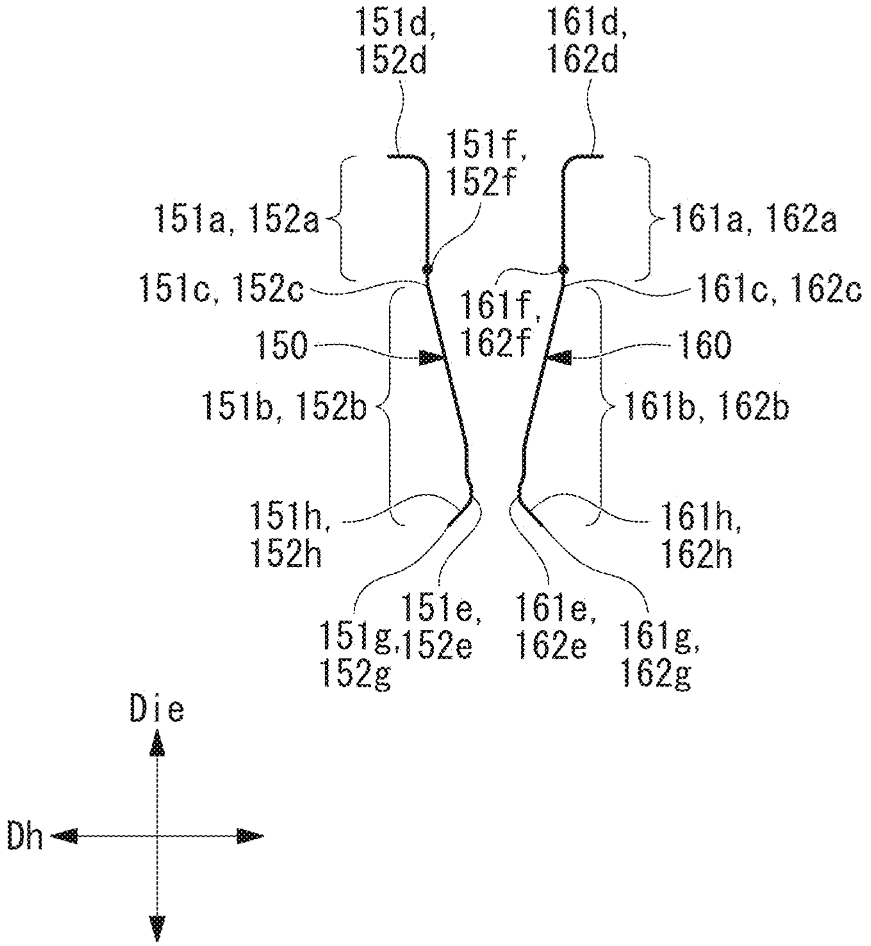
FIG. 8 is a side view of contact pins held by an inner housing.

As illustrated in FIG. 8, a signal pin 151 of the third pin group 150 is described as an example of a contact pin, for example. The signal pin 151 is a conductive member to ensure conduction between the mount substrate 11 and the pluggable substrate 22 and has a stationary piece 151*a* and a movable piece 151*b*. The signal pin 151 has a shape formed such that an elongate metal plate-like member extending in the longitudinal direction is bent at a plurality of points.

The stationary piece 151*a* is a piece from the terminal end (pin base end) of a mount part (a fixing part) 151*d* to a press-fit fixing part 151*f* and includes the mount part 151*d* and the press-fit fixing part 151*f*.

The mount part 151*d* is a portion connected (soldered) to the mount substrate 11 and faces outward.

Figure 9:
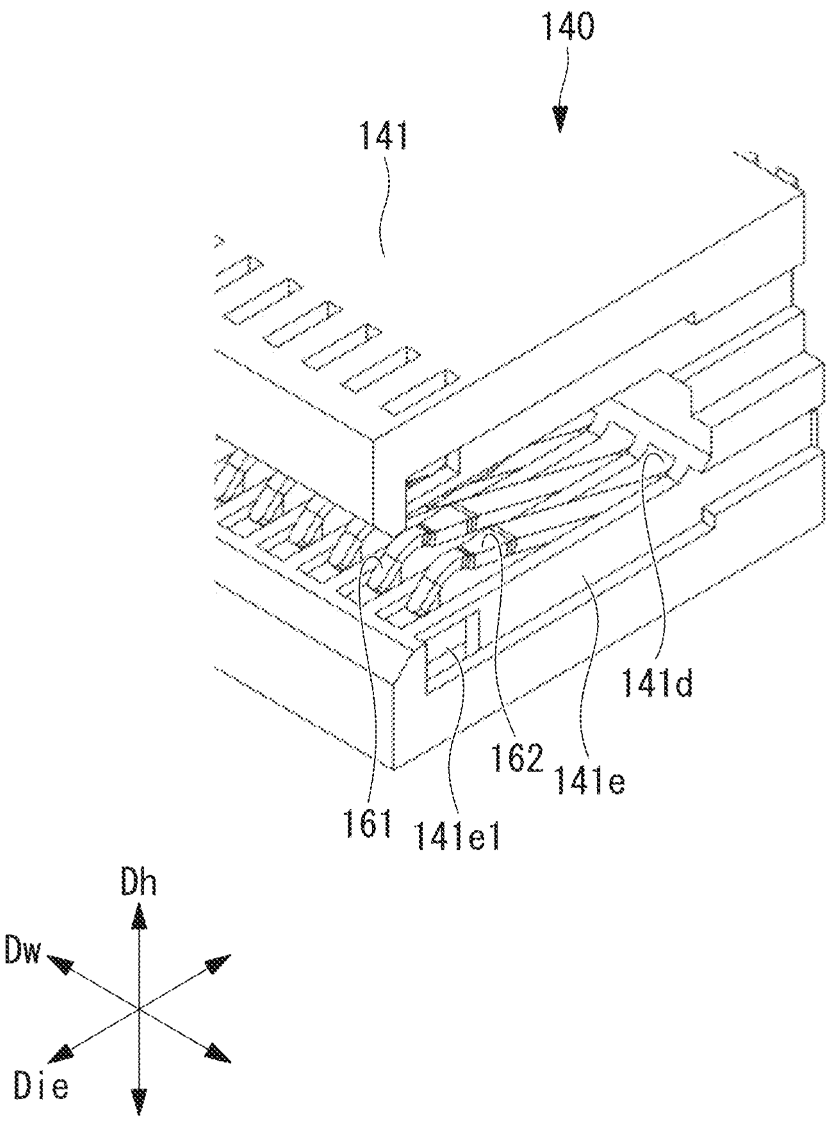
FIG. 9 is a sectional perspective view of the inner housing.

The press-fit fixing part 151*f* is a portion press-fitted in a groove 141*d* (see FIG. 9) formed in the inner wall of the main body 141. As illustrated in FIG. 9, each groove 141*d* is formed by partition walls 141*e* erected inwardly from the inner wall of the main body 141. The partition walls 141*e* extend in the longitudinal direction of signal pins 161 and ground pins 162 and are each provided so as to serve as a partition between each signal pin 161 and each ground pin 162. Accordingly, a plurality of grooves 141*d* (the number of which corresponds to the number of contact pins) each extending in the insertion-extraction direction Die are provided over the width direction Dw. A press-fit fixing part 161*f* (see FIG. 8) of a stationary piece 161*a* is press-fitted in the groove 141*d*, and thereby the signal pin 161 and the ground pin 162 are held by the inner housing 140.

In FIG. 8, the press-fit fixing part 151*f* is indicated by a black circle. The press-fit fixing part 151*f* is provided at a position closer to the mount part 151*d* than an inflection part 151*c* described later. The press-fit fixing part 151*f* is formed in a stationary piece 151*a* and forms a protruding part protruding in the width direction Dw, for example.

Note that the number of press-fit fixing parts 151*f* is not necessarily one, and a plurality of press-fit fixing parts 151*f* may be provided in a range of the signal pin 151 located closer to the mount part 151*d* than the inflection part 151*c*.

The movable piece 151*b* is a piece from the press-fit fixing part 151*f* to the tip (pin tip) 151*g* on a contact part 151*e* side and includes the inflection part 151*c* and the contact part 151*e*. A tip part 151*h* from the contact part 151*e* to the tip 151*g* is a free end bent outward at the contact part 151*e*.

Note that the above expression of a piece "from the press-fit fixing part 151*f*" in the description of the movable piece 151*b* means in detail that the piece does not include the press-fit fixing part 151*f* and starts from a portion closer to the pin tip adjacent to the press-fit fixing part 151*f*. Thus, the press-fit fixing part 151*f* is the boundary between the stationary piece 151*a* and the movable piece 151*b* and is included in the stationary piece 151*a*. Further, when a plurality of press-fit fixing parts 151*f* are present, the boundary between the stationary piece 151*a* and the movable piece 151*b* is defined as the press-fit fixing part 151*f* that is the closest to the pin tip.

The contact part 151*e* is a portion in contact with the pluggable substrate 22 and curved so as to be convex inward.

The unloaded movable piece 151*b* is inclined inward by the inflection part 151*c* and is deformed so as to be opened outward when the pluggable substrate 22 is inserted in the connector 100.

In the same manner as the signal pin 151 of the third pin group 150, the signal pin 161 of the fourth pin group 160 has a stationary piece 161*a* including a mount part (a fixing part) 161*d* and a press-fit fixing part 161*f* and a movable piece 161*b* including an inflection part 161*c* and a contact part 161*e*. Further, a tip part 161*h* from the contact part 161*e* to the tip 161*g* is a free end bent outward at the contact part 161*e*.

In the same manner as the signal pin 151 of the third pin group 150, the ground pin 152 of the third pin group 150 has a stationary piece 152*a* including a mount part (a fixing part) 152*d* and a press-fit fixing part 152*f* and a movable piece 152*b* including an inflection part 152*c* and a contact part 152*e*. Further, a tip part 152*h* from the contact part 152*e* to the tip 152*g* is a free end bent outward at the contact part 152*e*.

In the same manner as the signal pin 151 of the third pin group 150, the ground pin 162 of the fourth pin group 160 has a stationary piece 162*a* including a mount part (a fixing part) 162*d* and a press-fit fixing part 162*f* and a movable piece 162*b* including an inflection part 162*c* and a contact part 162*e*. Further, a tip part 162*h* from the contact part 162*e* to the tip 162*g* is a free end bent outward at the contact part 162*e*.

As illustrated in FIG. 5, the third pin group 150 and the fourth pin group 160 are located between the first pin group 120 and the second pin group 130 and arranged so as to face each other with a predetermined spacing therebetween in the height direction Dh. In this state, the press-fit fixing part 121*f* (see FIG. 6) of the signal pin 121 of the first pin group 120 and the press-fit fixing part 151*f* (see FIG. 8) of the signal pin 151 of the third pin group 150 are arranged on substantially the same straight line L1 along the insertion-extraction direction Die. Also, for the ground pin 122 and the ground pin 152, the signal pin 131 and the signal pin 161, and the ground pin 132 and the ground pin 162, the press-fit fixing parts 122*f*, 152*f*, 131*f*, 161*f*, 132*f*, 162*f* are arranged on the same straight lines L1, L2.

<<Partition Wall>>

Figure 10:
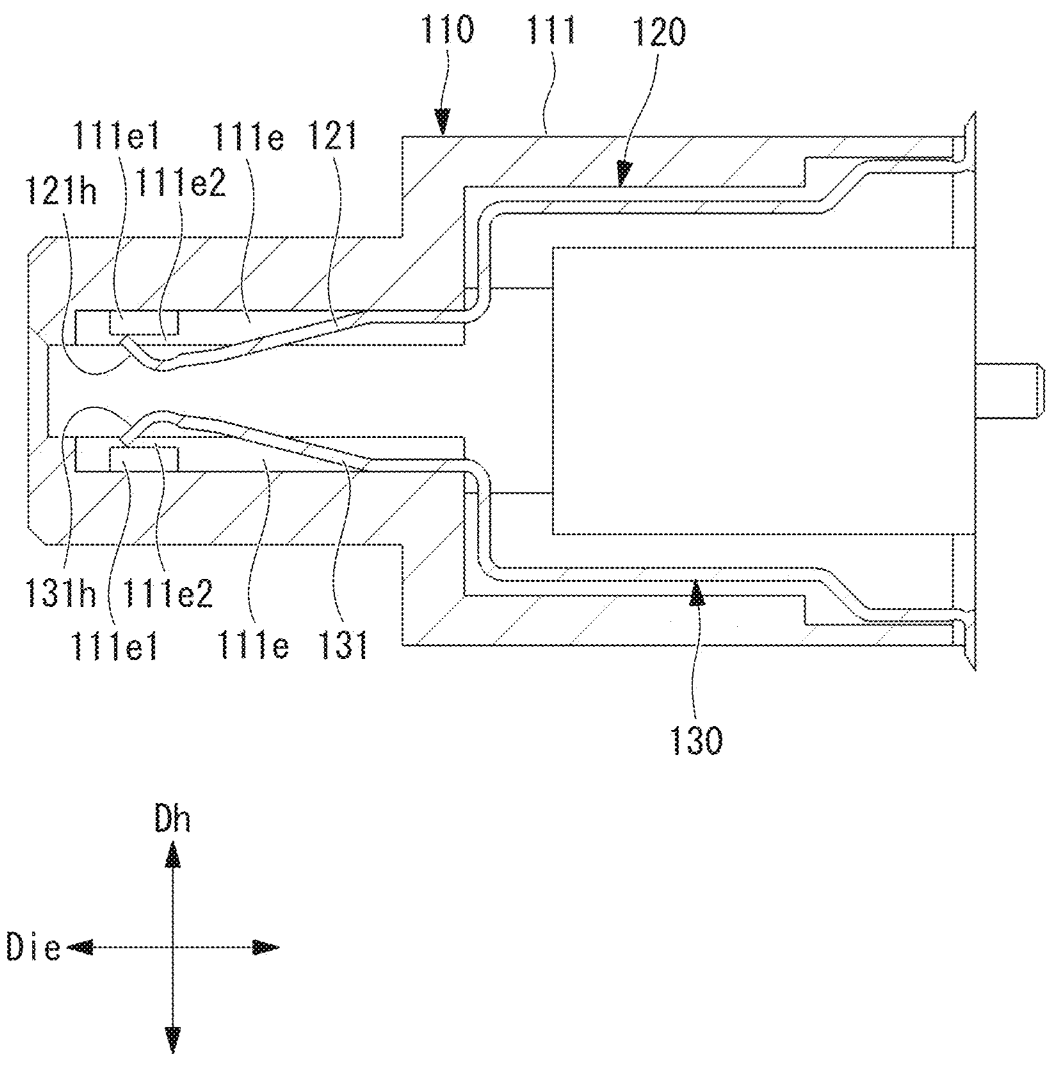
FIG. 10 is a cross sectional view of the outer housing in an unloaded state.

FIG. 10 corresponds to FIG. 5 and illustrates only the outer housing 110, the first pin group 120, and the second pin group 130. Note that FIG. 10 represents a position rotated by 90 degrees clockwise from FIG. 5. Thus, the insertion-extraction direction Die is the horizontal direction in FIG. 10.

As illustrated in FIG. 10, each partition wall 111*e* is formed integrally with the main body 111 of the resin housing 110 and provided so as to partition adjacent signal pins (contact pins) 121, 131 from each other. An opening 111*e*1 is formed in the partition wall Ille. The opening 111*e*1 has a rectangular shape and penetrates the partition wall 111*e* in the plate-thickness direction (the direction orthogonal to the sheet of FIG. 10). The opening 111*e*1 has a shape whose perimeter is closed by a connecting part 111*e*2. The connecting part 111*e*2 is provided such that the wall end part serving as the free end of the partition wall 111*e* is formed continuously in the longitudinal direction. The position in the insertion-extraction direction Die of the opening 111*e*1 is a position corresponding to the tip part 121*h*, 131*h* of the signal pin (connector pin) 121, 131.

Figure 11:
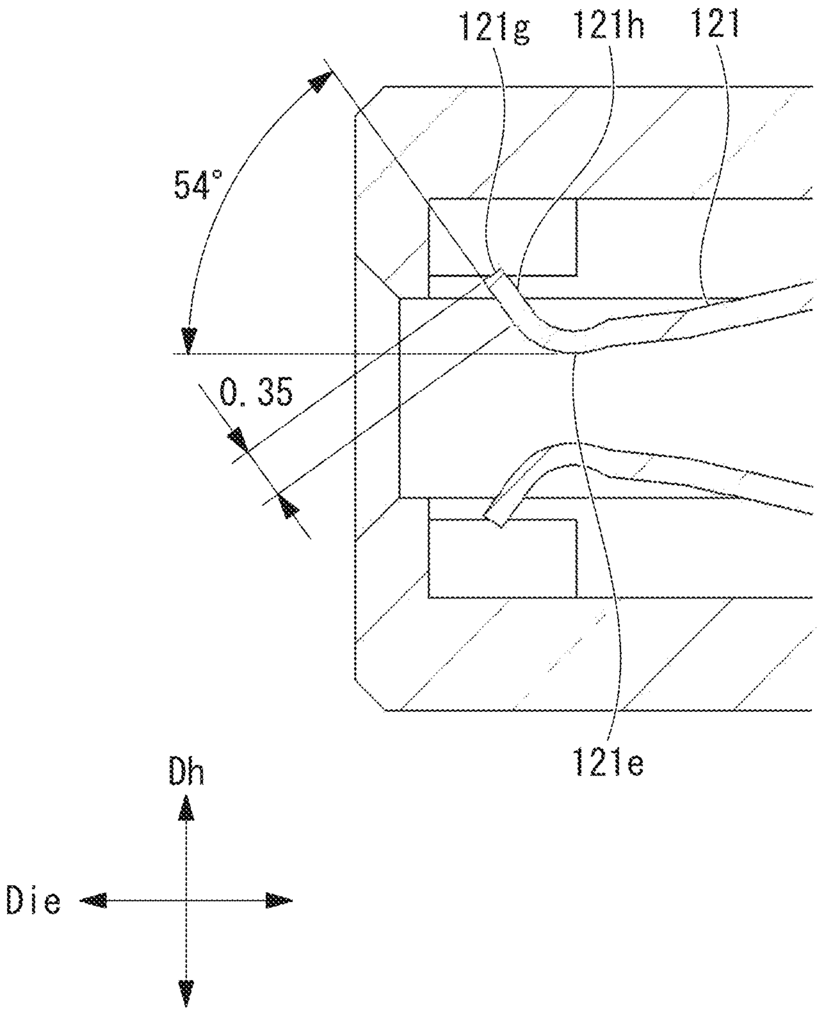
FIG. 11 is a partially enlarged cross sectional view of FIG. 10.

As illustrated in FIG. 11, for example, the length of the straight part of the tip part 121*h* of the signal pin 121 is greater than or equal to 0.20 mm and less than or equal to 0.50 mm and is preferably 0.35 mm, for example. In the tip part 121*h*, the bending angle at the contact part 121*e* is, for example, greater than or equal to 45 degrees and less than or equal to 65 degrees and is preferably 54 degrees outward relative to the insertion-extraction direction Die (the horizontal direction in FIG. 11) in an unloaded state where the pluggable substrate 22 is not inserted.

Figure 12:
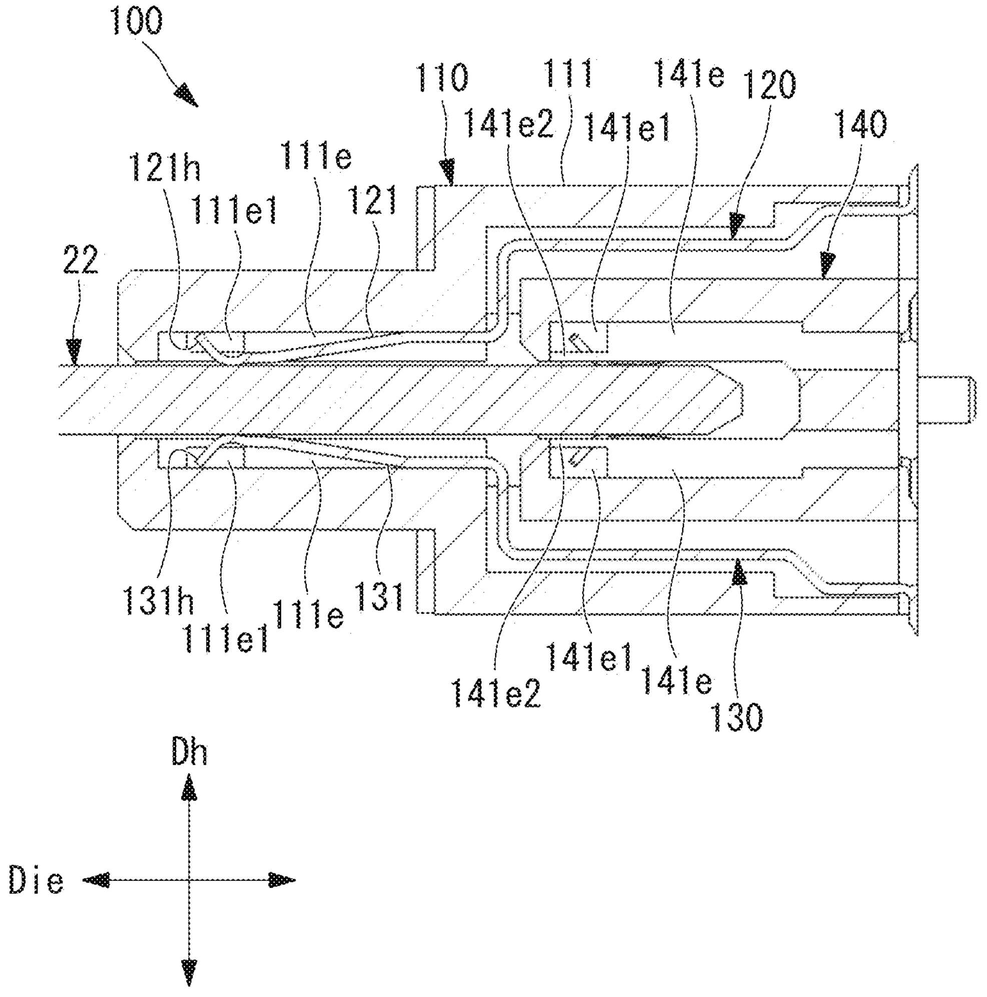
FIG. 12 is a cross sectional view illustrating a state where a pluggable substrate is inserted in the connector.

FIG. 12 illustrates a state where the pluggable substrate 22 is inserted. FIG. 12 illustrates not only the outer housing 110 but also the inner housing 140. The feature in which an opening 141*e*1 and a connecting part 141*e*2 are also formed in the partition wall 141*e* of the inner housing 140 is the same as the opening 111*e*1 and the connecting part 111*e*2 of the partition wall 111*e* of the outer housing 110.

Figure 13:
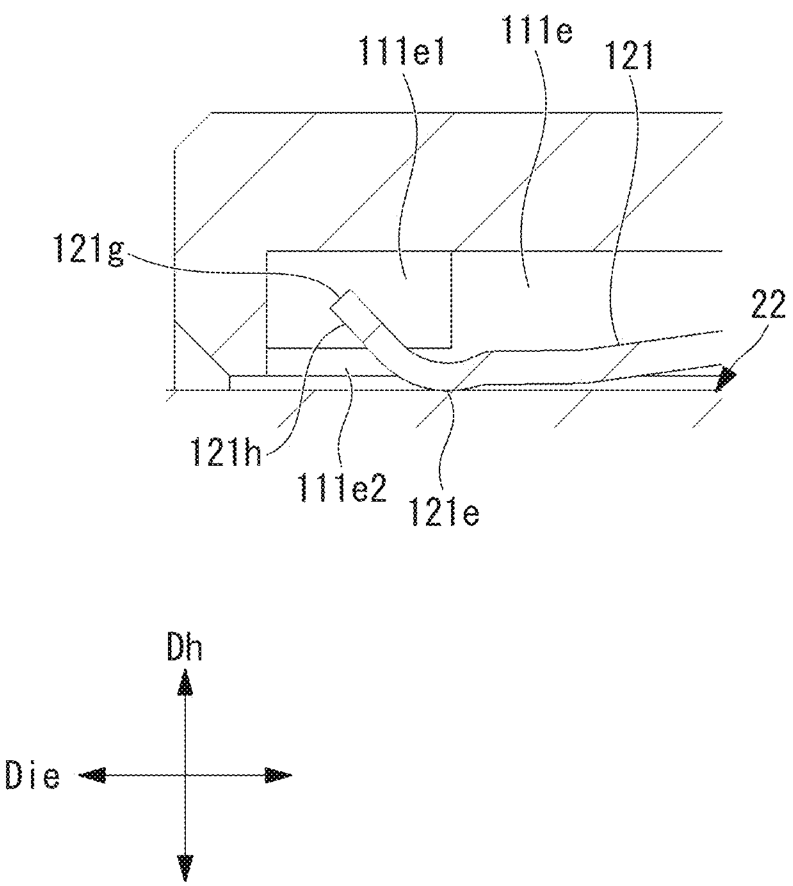
FIG. 13 is a partially enlarged cross sectional view illustrating a part around an opening of an outer connector.

FIG. 13 illustrates a state where the pluggable substrate 22 is inserted and the contact parts 121*e*, 131*e* (see FIG. 6) and the contact parts 151*e*, 161*e* (see FIG. 8) of the signal pins 121, 131, 151, 161 are in electrical contact with the electrodes of the pluggable substrate 22 as with FIG. 12. Note that FIG. 13 illustrates a part around the tip part 121*h* of the signal pin 121 as representative. As illustrated in FIG. 13, the tip part 121*h* of the signal pin 121 moves to a position corresponding to a space formed by the opening 111*e*1 in a state where the pluggable substrate 22 and the signal pin 121 are in electrical contact. More specifically, the tip part 121*h* moves above the connecting part 111*e*2 (on the space side) by a predetermined distance from the tip 121g of the signal pin 121. Accordingly, the tip parts 121*h* adjacent in the aligning direction in the first pin group 120 are located via the space defined by the opening 111*e*1.

On the other hand, the signal pins 121 are partitioned by the partition wall 111*e* on the base end side (on the contact part 121*e* side) from the tip parts 121*h*.

The same positional relationship between the opening 111*e*1 and the tip part 121*h* of the signal pin 121 illustrated in FIG. 13 applies to the positional relationship between the signal pin 131, the ground pin 122, 132, and the opening 111*e*1 and further applies to the relationship between the opening 141*e*1 of the inner housing 140 and the tip parts 151*h*, 161*h* of the signal pins 151, 161 and between the opening 141*e*1 of the inner housing 140 and the tip parts 152*h*, 162*h* of the ground pins 152, 162.

Figure 14:
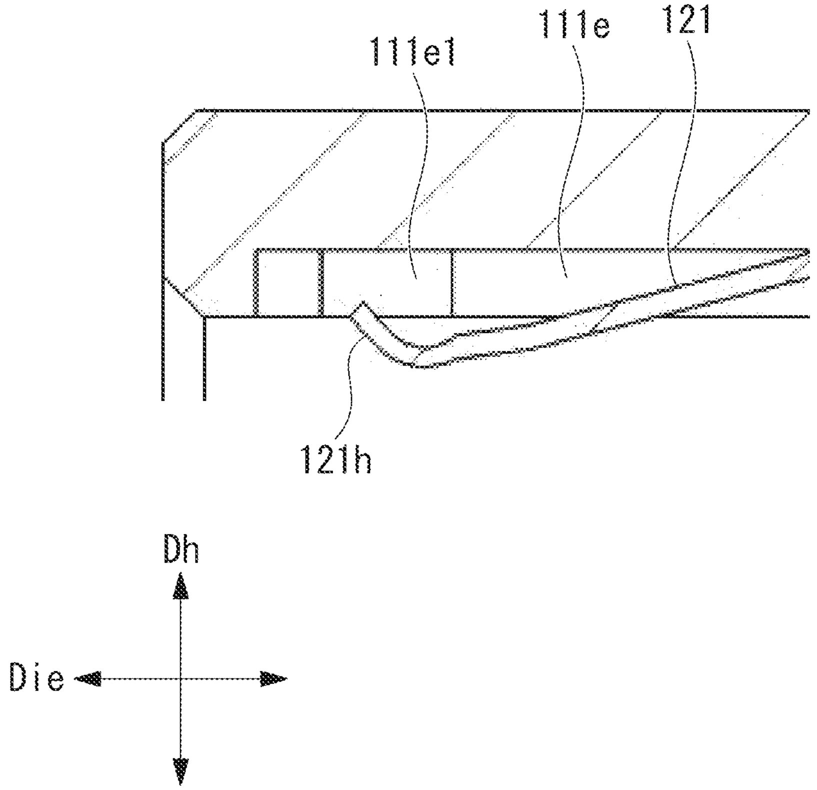
FIG. 14 is a partially enlarged cross sectional view illustrating a modified example of FIG. 13.

Note that, as illustrated in FIG. 14, the connecting part 111*e*2 provided in the partition wall 111*e* may be omitted, and the opening 111*e*1 opened at the free end side of the partition wall 111*e* may be employed. Even with such an opening 111*e*1, the tip part of the contact pin can move to a position corresponding to the opening 111*e*1 when being in electrical contact with the pluggable substrate 22. The shape of the opening 111*e*1 without the connecting part 111*e*2 can be applied to the opening 141*e*1 of the inner housing 140.

Figure 15:
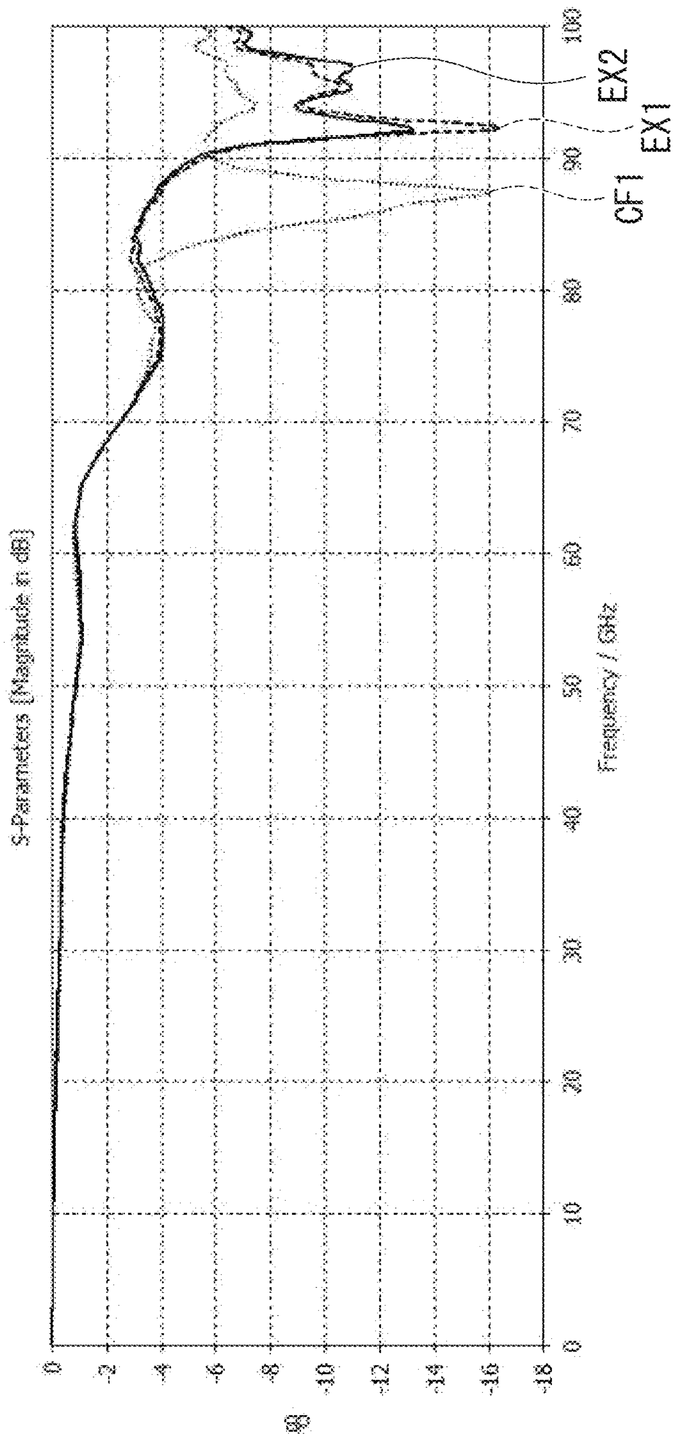
FIG. 15 is a graph illustrating insertion losses.

FIG. 15 illustrates insertion losses of connectors calculated by a simulation. In FIG. 15, the horizontal axis represents the frequency (GHz), and the vertical axis represents the insertion loss (dB). The dotted line CF1 represents Reference example 1 not having the opening 111*e*1, 141*e*1 of the connector 100 described above, the dashed line EX1 represents Example 1 having the openings 111*e*1, 141*e*1 and the connecting part 111*e*2 as with FIG. 13, and the solid line EX2 represents Example 2 having the openings 111*e*1, 141*e*1 but not having the connecting part 111*e*2 as with FIG. 14.

As can be seen from FIG. 15, in Reference example 1 (dotted line CF1) not having the opening 111*e*1, 141*e*1, a large insertion loss was observed between 80 GHz and 90 GHz. In contrast, in Example 1 (dashed line EX1) and Example 2 (solid line EX2), no insertion loss was observed between 80 GHz and 90 GHz, and the first large insertion loss was observed at 92 GHz. Further, the insertion loss around 92 GHz is smaller in Example 2 (solid line EX2) than in Example 1 (dashed line EX1).

Figure 16:
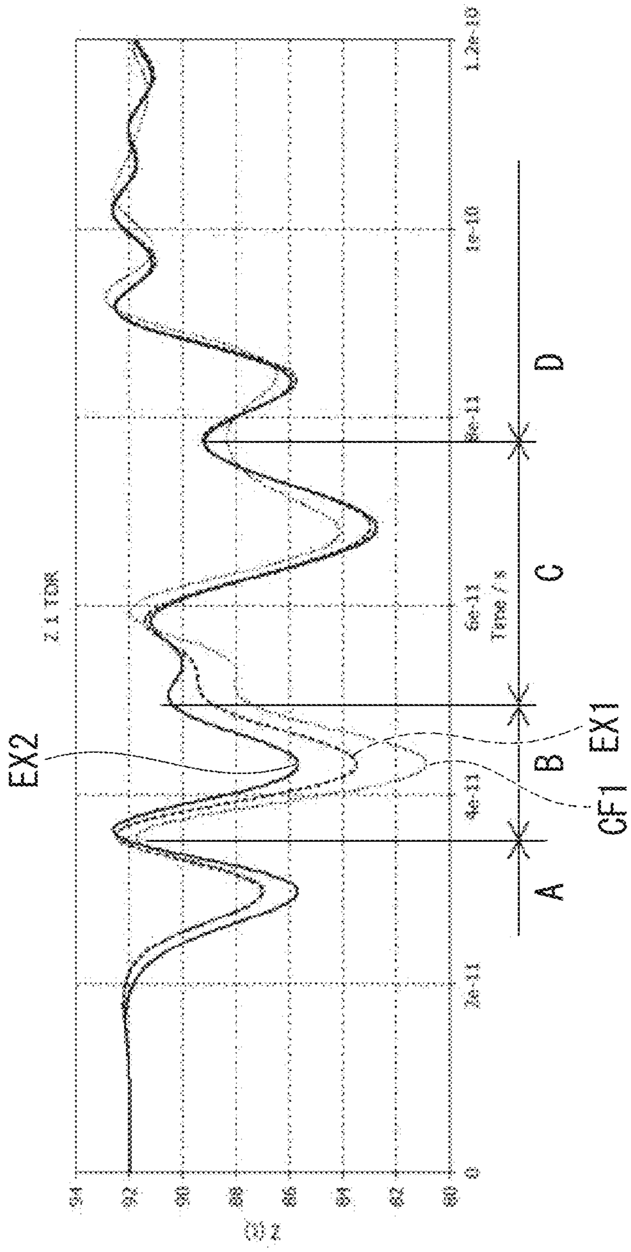
FIG. 16 is a graph illustrating impedance characteristics.
Figure 17:
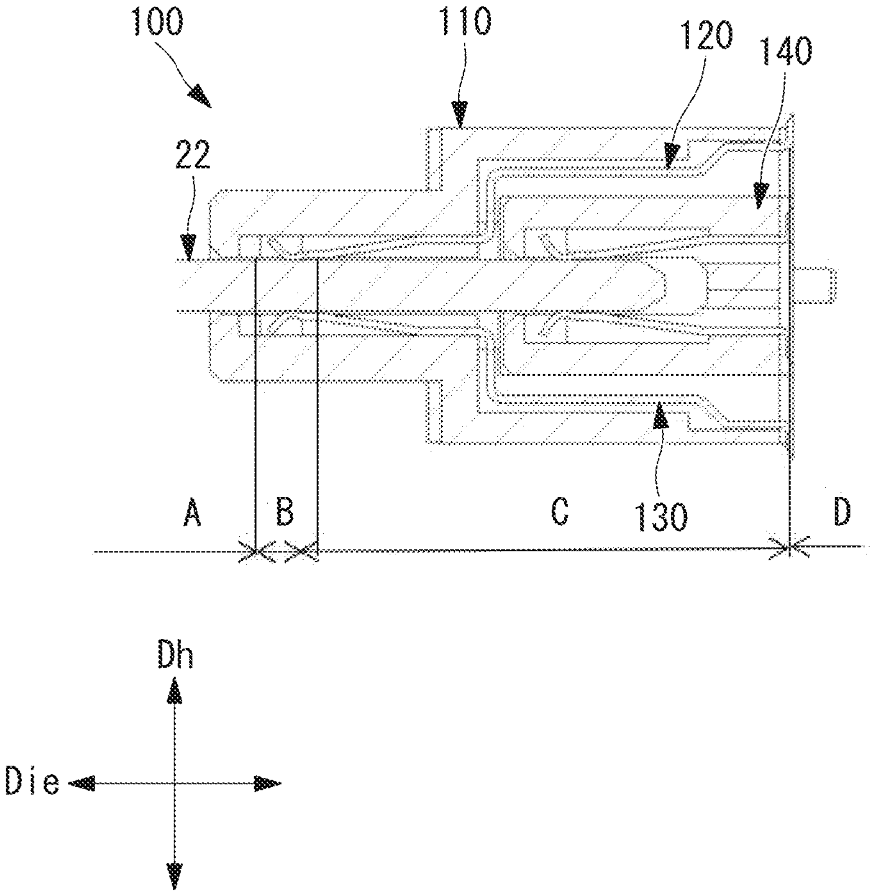
FIG. 17 is a cross sectional view of the connector illustrating respective regions of FIG. 16.

FIG. 16 illustrates a result of a time domain reflectometry (TDR) analysis in which impedance improvement characteristics are calculated by a simulation for examining a cause of the reduction effect on insertion losses illustrated in FIG. 15. In FIG. 16, the horizontal axis represents the time (s), and the vertical axis represents the impedance ((2). The time (s) on the horizontal axis generally corresponds to the electrical length, which has a positional relationship illustrated in FIG. 17. FIG. 17 corresponds to FIG. 12 and illustrates the connector 100 not having the connecting part 111*e*2. Specifically, reference A represents a region from the pluggable substrate 22 side to the contact pin tip, reference B represents a region from the end of the region of reference A to a part around the tip part and the contact part of the contact pin, reference C represents a region from the end of the region of reference B to a mount part of the contact pin, and reference D represents a region from the end of the region of reference C to and beyond the mount substrate 11 (see FIG. 1).

As can be seen from FIG. 16, a significant difference of Example 1 (dashed line EX1) and Example 2 (solid line EX2) from Reference example 1 (dotted line CF1) appears in the region of reference B. Specifically, the impedance reduction in the region of reference B is the largest in Reference example 1 (dotted line CF1), the second largest in Example 1 (dashed line EX1), and the smallest in Example 2 (solid line EX2). As such, improvement of the impedance due to the openings 111*e*1, 141*e*1 was observed in the region of reference B. Such a reduction in impedance mismatch leads to shift a large drop of the insertion loss to the ultra-high frequency region near 92 GHz as seen in FIG. 15. This is highly effective in achieving high-speed transmission above 100 Gbps.

According to the connector 100 of the present embodiment, the following effects and advantages are achieved.

The partition wall 111*e*, 141*e* is provided between adjacent contact pins (the signal pins 121, 131, 151, 161 and the ground pins 122, 132, 152, 162). On the other hand, in a state where the contact parts 121*e*, 122*e*, 131*e*, 132*e*, 151*e*, 152*e*, 161*e*, 162*e* are in contact with electrodes of the pluggable substrate 22, a space is provided between the tip parts 121*h*, 122*h*, 131*h*. 132*h*, 151*h*, 152*h*, 161*h*, 162*h* of the adjacent contact pins. Accordingly, the dielectric constant between the tip parts can be smaller than a case where a material object made of a resin or the like such as the partition wall is interposed between the tip parts of the contact pins. This can improve the impedance characteristics of the connector 100.

The openings 111*e*1, 141*e*1 are formed in the partition walls 111*e*, 141*e* to form a space between the tip parts of the adjacent contact pins. Accordingly, the space can be formed with a simple configuration.

The connecting parts 111*e*2, 141*e*2 are provided so that the wall end part serving as the free end of the partition wall 111*e*, 141*e* is continuous in the longitudinal direction. Because of the connecting parts 111*e*2, 141*e*2, the openings 111*e*1, 141*e*1 have a shape with a closed perimeter. The connecting parts 111*e*2, 141*e*2 are provided such that the wall end part of the partition walls 111*e*, 141*e* each are continuous in the longitudinal direction, and thus the strength of the partition walls 111*e*, 141*e* can be enhanced.

Note that the present embodiment can be modified as follows.

Figure 18:
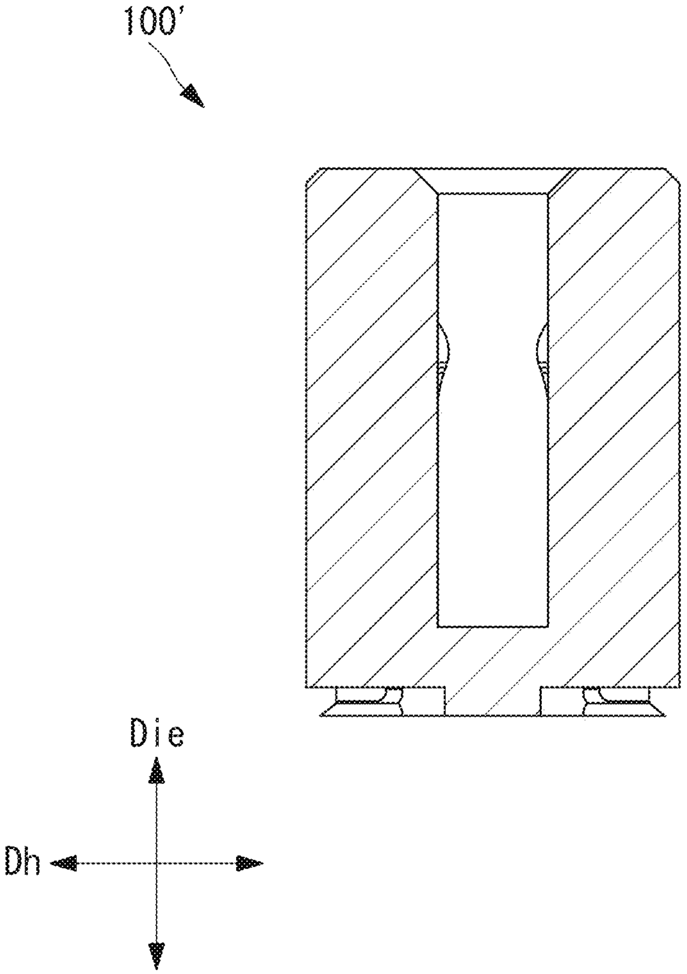
FIG. 18 is a cross sectional view illustrating a modified example.

Although the connector 100 of the two-stage configuration having the outer housing 110 and the inner housing 140 is employed in the present embodiment, a connector 100' of a single-stage configuration may be employed as illustrated in FIG. 18. Note that, in FIG. 18, the insertion-extraction direction Die is the vertical direction, the insertion-extraction part is located above, and the mount part is located below. Even with such a modified example, an opening is provided in the partition wall as illustrated in FIG. 13 and FIG. 14, and thereby improved impedance characteristics can be achieved.

Figure 19:
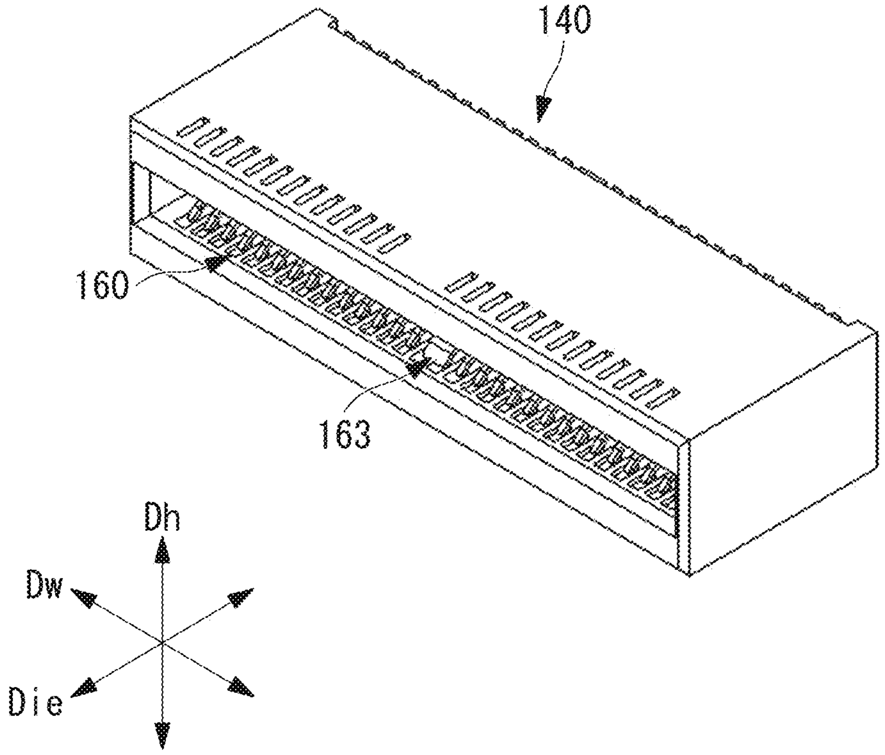
FIG. 19 is a perspective view of an inner connector illustrating a modified example.

Further, as illustrated in FIG. 19, a power supply pin 163 may be provided at the center of a pin group (the fourth pin group 160 of the inner housing 140 in FIG. 19), and two of the contact pins may be integrated. Accordingly, the number of components can be reduced. The power supply pin 163 having such a shape can also be applied to other pin groups 120, 130, 150.

Second Embodiment

A connector according to a second embodiment of the present invention will be described with reference to the drawings.

Note that, in the same manner as the first embodiment, the insertion-extraction direction Die, the width direction Dw, and the height direction Dh used in the following description are the names based on the orientation in FIG. 20, but they are not intended to limit the orientation in a system in actual usage.

Further, the present embodiment can also be applied to the connector 100 of the first embodiment.

Figure 20:
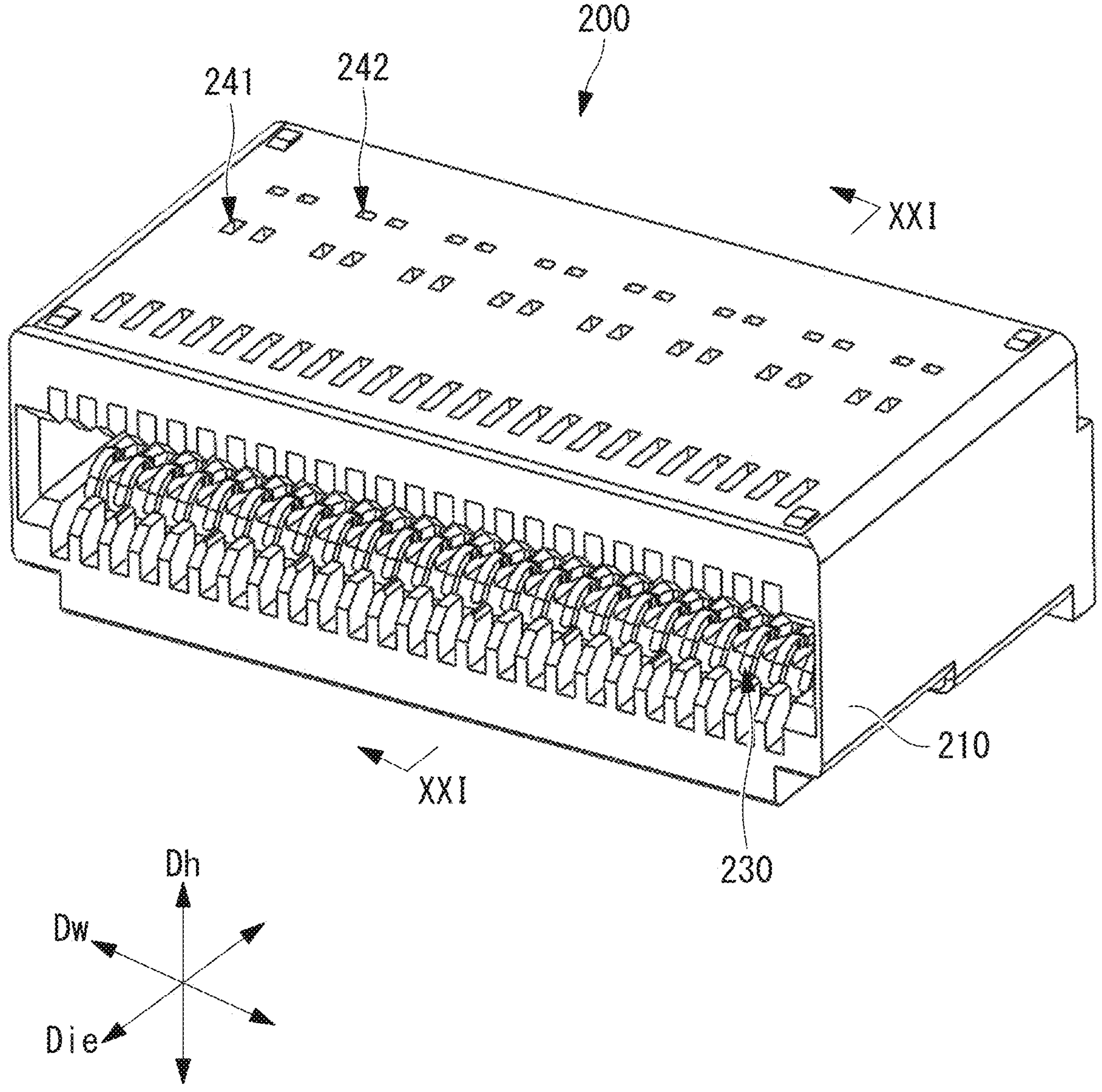
FIG. 20 is a perspective view of a connector according to a second embodiment.

As illustrated in FIG. 20, a connector 200 is a connector that is mounted on a mount substrate (not illustrated) thereunder and in which a device is inserted in the insertion-extraction direction Die. Thus, the connector 200 is a connector for electrically connecting the mount substrate and the device to each other. The device may be a plug connector having a substrate having electrodes or a plug connector having contact pins as an example.

Figure 21:
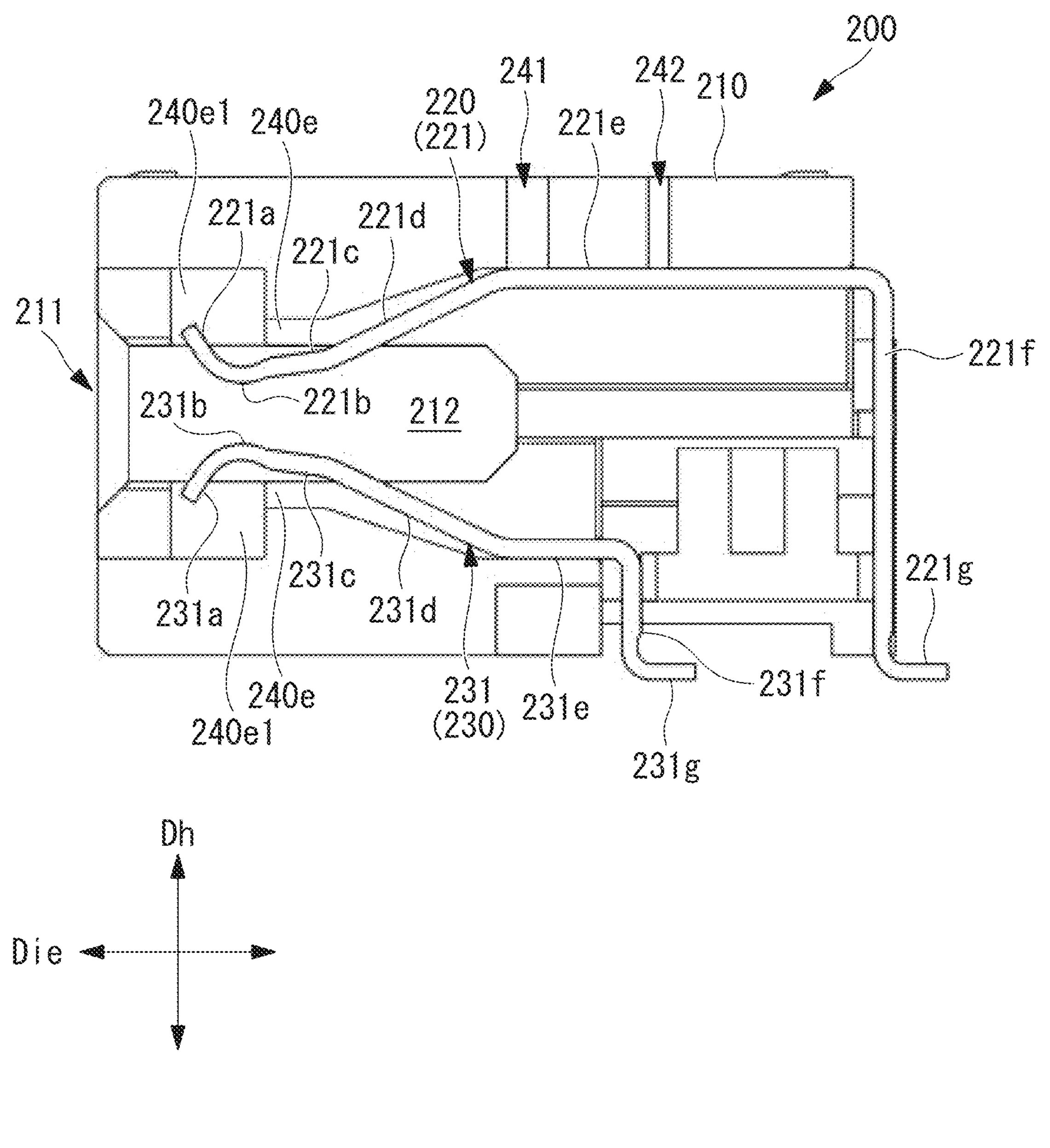
FIG. 21 is a cross sectional view taken along a cutting-plane line XXI-XXI of FIG. 20.

As illustrated in FIG. 21, the connector 200 includes a housing 210, a top pin group 220 (a first pin group), and a bottom pin group 230 (a second pin group).

The housing 210 is a component having substantially a rectangular parallelepiped external shape and accommodates and holds the top pin group 220 and the bottom pin group 230. The housing 210 is a nonconductive member and is molded with a resin or the like, for example.

A front opening 211 communicating with an insertion space 212 formed inside the housing 210 is opened in the front face of the housing 210. A tip side of a substrate (not illustrated) having an electrode is inserted in the insertion space 212 via the front opening 211.

A plurality of contact pins 221 are aligned in the width direction Dw (the direction orthogonal to the sheet of FIG. 21) to configure the top pin group 220. Each contact pin 221 has a shape formed such that an elongate metal plate-like member extending in the longitudinal direction is bent at a plurality of points. The extending direction of each contact pin 221 matches the longitudinal direction of the housing 210 (the insertion-extraction direction Die). The top pin group 220 includes signal pins through which signals are transmitted, ground pins to be grounded, and power supply pins used for supplying power. The signal pins for a high-speed signal form a differential pair, for example, and the ground pins are provided to correspond to differential pairs.

The contact pin 221 has a tip part 221*a*, a contact part 221*b*, a parallel beam part 221*c*, a spring beam part 221*d*, a press-fit part 221*e*, an erect part 221*f*, and a mount part 221*g* in this order from the tip side to the base end side (the left side to the right side in FIG. 21).

The tip part 221*a* is made straight and bent diagonally outward from the contact part 221*b*. The contact part 221*b* is in electrical contact with an electrode of a substrate inserted from the front opening 211. The parallel beam part 221*c* is made straight so as to be substantially parallel to a substrate in a state where the substrate is inserted in the insertion space 212. The spring beam part 221*d* is a portion to be elastically deformed in accordance with an operation of inserting and extracting the substrate and is made straight. The press-fit part 221*e* is a portion press-fitted into the housing 210 and secured therein and is made straight. The erect part 221*f* is bent at substantially a right angle relative to the press-fit part 221*e*, extends in the height direction Dh, and is made straight. The mount part 221*g* is fixed to a mount substrate (not illustrated) by soldering or the like.

In FIG. 21, a plurality of contact pins 231 are aligned in the width direction Dw (the direction orthogonal to the sheet of FIG. 21) to configure the bottom pin group 230. Each contact pin 231 has a shape formed such that an elongate metal plate-like member extending in the longitudinal direction is bent at a plurality of points. The extending direction of each contact pin 231 matches the longitudinal direction of the housing 210 (the insertion-extraction direction Die).

The bottom pin group 230 includes signal pins through which signals are transmitted, ground pins to be grounded, and power supply pins used for supplying power. The signal pins for a high-speed signal form a differential pair, for example, and the ground pins are provided to correspond to differential pairs.

The contact pin 231 has a tip part 231*a*, a contact part 231*b*, a parallel beam part 231*c*, a spring beam part 231*d*, a press-fit part 231*e*, an erect part 231*f*, and a mount part 231*g* in this order from the tip side to the base end side (the left side to the right side in FIG. 21).

The tip part 231*a* is made straight and bent diagonally outward from the contact part 231*b*. The contact part 231*b* is in electrical contact with an electrode of a substrate inserted from the front opening 211. The parallel beam part 231*c* is made straight so as to be substantially parallel to a substrate in a state where the substrate is inserted in the insertion space 212. The spring beam part 231*d* is a portion to be elastically deformed in accordance with an operation of inserting and extracting the substrate and is made straight. The press-fit part 231*e* is a portion press-fitted into the housing 210 and secured therein and is made straight. The press-fit part 231*e* has a smaller dimension in the longitudinal direction (the lateral direction in FIG. 21) than the press-fit part 221*e* of the top pin group 220. The erect part 231*f* is bent at substantially a right angle relative to the press-fit part 231*e*, extends in the height direction Dh, and is made straight. The mount part 231*g* is fixed to a mount substrate (not illustrated) by soldering or the like.

In a state where the top pin group 220 and the bottom pin group 230 are assembled to the housing 210, the contact part 221*b* of the top pin group 220 is arranged so as to face the contact part 231*b* of the bottom pin group 230 in the insertion space 212.

Figure 22:
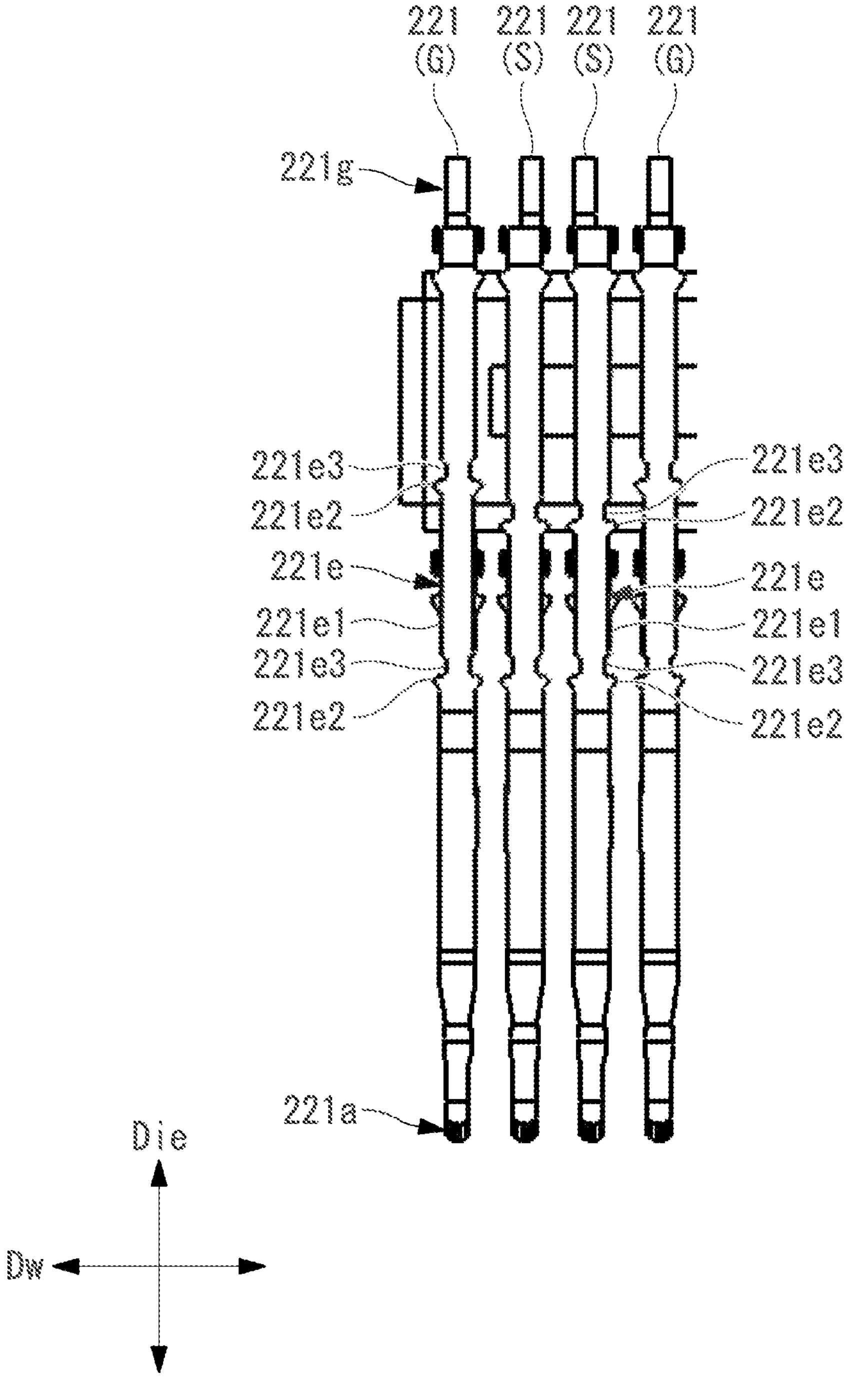
FIG. 22 is a partially enlarged plan view illustrating contact pins of the connector of FIG. 20.

As illustrated in FIG. 22, each press-fit part 221*e* of the contact pins 221 is provided with protruding parts 221*e*2 protruding from a main body 221*e*1 of the press-fit part 221*e* outwardly in the width direction orthogonal to the plate-thickness direction and the longitudinal direction of the contact pin 221. The protruding part 221*e*2 is press-fitted by being in contact with the housing 210. Each position adjacent to the protruding parts 221*e*2 is provided with a narrow-width part 221*e*3 having a narrower width than the main body 221*e*1.

The position of the protruding part 221*e*2 and the narrow-width part 221*e*3 in the longitudinal direction (the insertion-extraction direction Die) is the same between the signal pin 221(S) and the ground pin 221(G) of the contact pins 221 on the tip part 221*a* side but is different in the longitudinal direction between the signal pin 221(S) and the ground pin 221(G) on the mount part 221*g* side. Specifically, on the mount part 221*g* side, the protruding part 221*e*2 and the narrow-width part 221*e*3 of the group pin 221(G) are offset to the mount part 221*g* side from the protruding part 221*e*2 and the narrow-width part 221*e*3 of the signal pin 221(S).

Figure 23:
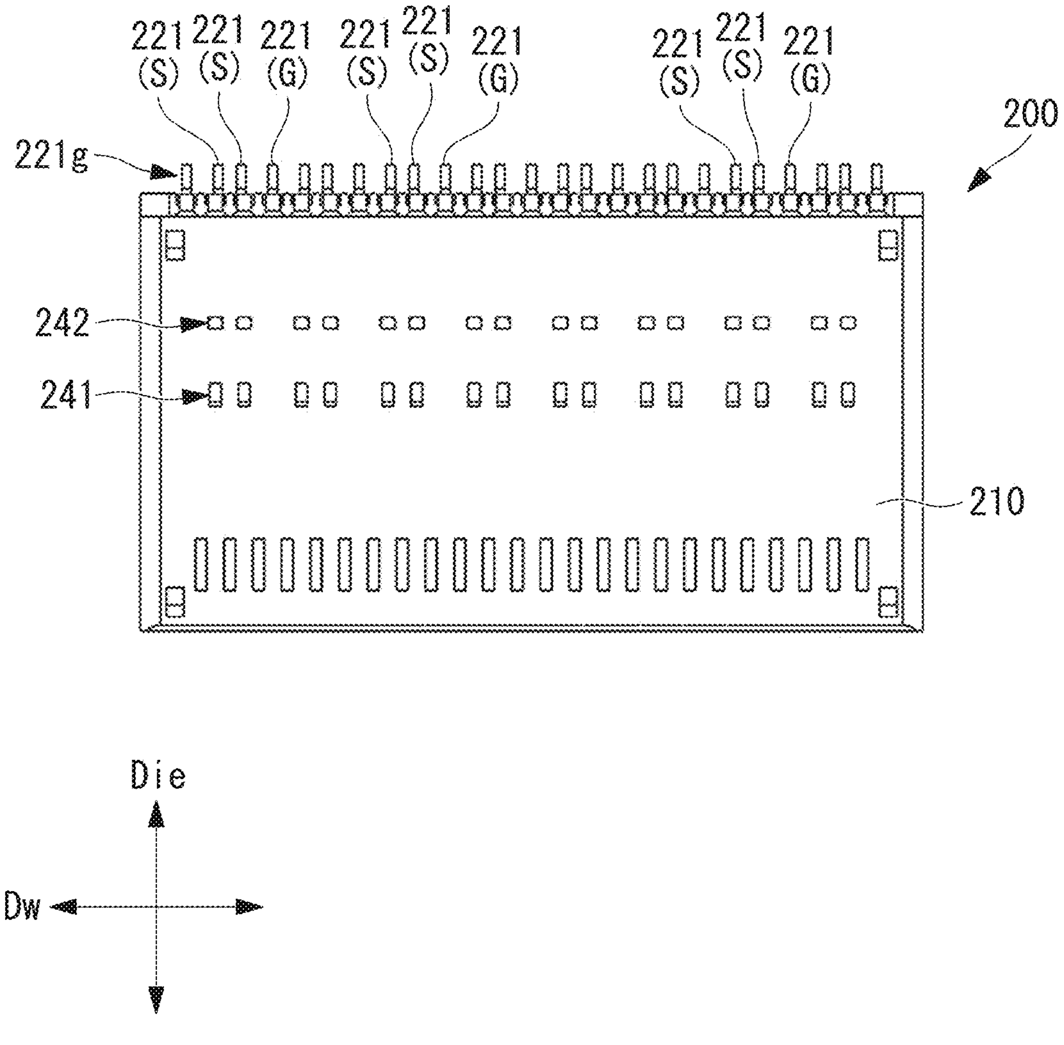
FIG. 23 is a plan view of the connector of FIG. 20.
Figure 24:
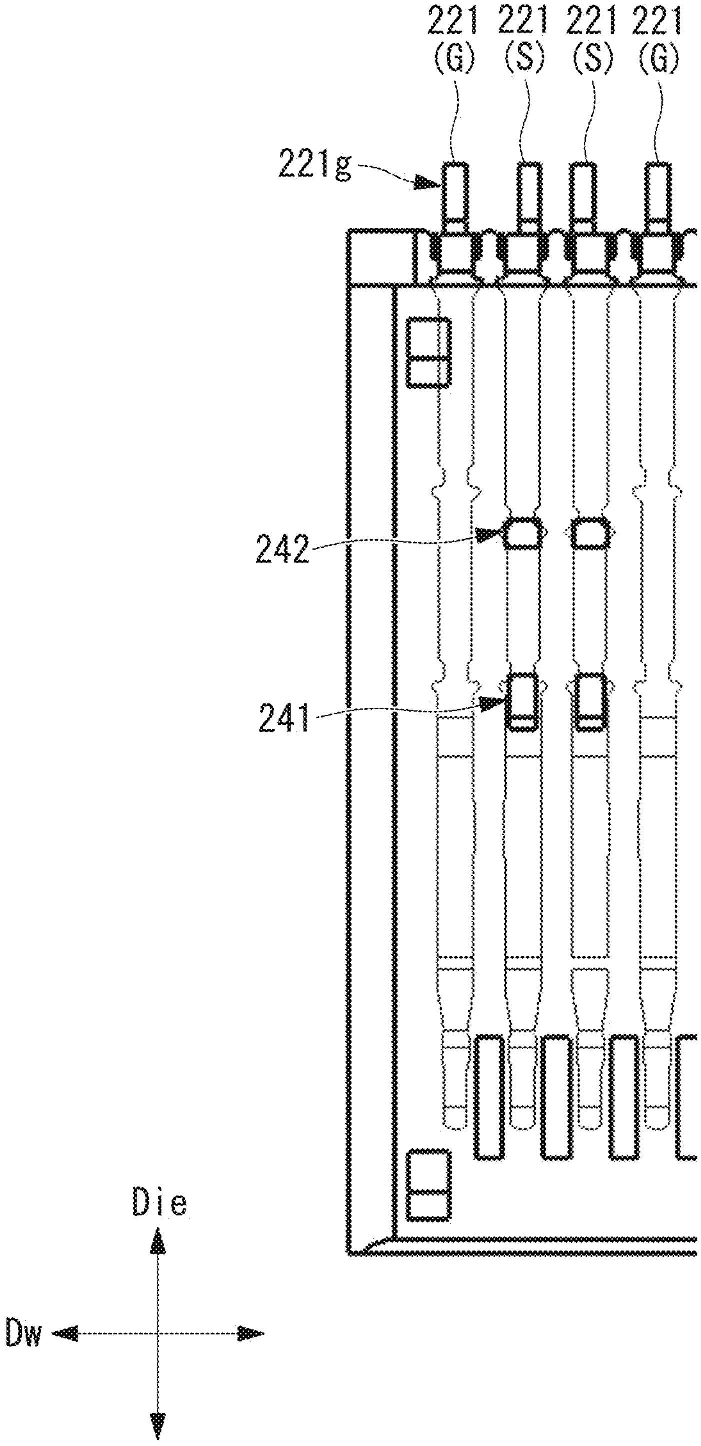
FIG. 24 is a plan view illustrating a partially enlarged connector of FIG. 23.

As illustrated in FIG. 21, through holes 241, 242 are formed at positions corresponding to the press-fit part 221*e* of the top pin group 220. Two through holes 241, 242 are provided in the longitudinal direction of the contact pin 221. Specifically, the through holes 241, 242 are provided at the position corresponding to the protruding part 221*e*2 (see FIG. 22) of the signal pin 221(S) of the contact pins 221. Thus, as illustrated in FIG. 23 and FIG. 24, the through holes 241, 242 are provided in the signal pin S but are not provided in the ground pin G of the contact pins 221.

Each of the through holes 241, 242 is provided such that a space is formed above the upper face (planar part) of the contact pin 221 in FIG. 21. Specifically, the through holes 241, 242 are provided so as to penetrate from the upper face of the housing 210 to the space where the contact pin 221 is located. Accordingly, the planar part that is the upper face of the press-fit part 221*e* of the contact pin 221 has a noncontact region, which is not in contact with the housing 210, at the positions corresponding to the through holes 241, 242, while the planar part has a contact region, which is in contact with the housing 210, at the positions not corresponding to the through holes 241, 242.

Note that, in the housing 210, no through hole similar to the through holes 241, 242 is provided at the position corresponding to the press-fit part 231*e* of the bottom pin group 230.

As illustrated in FIG. 21, an opening 240*e*1 is formed in the partition plate 240*e* in the same manner as the first embodiment (for example, see FIG. 13 and FIG. 14). Although, in FIG. 21, the opening 240*e*1 has no connecting part as with FIG. 14, the connecting part 111*e*2 may be provided as with FIG. 13.

Figure 25:
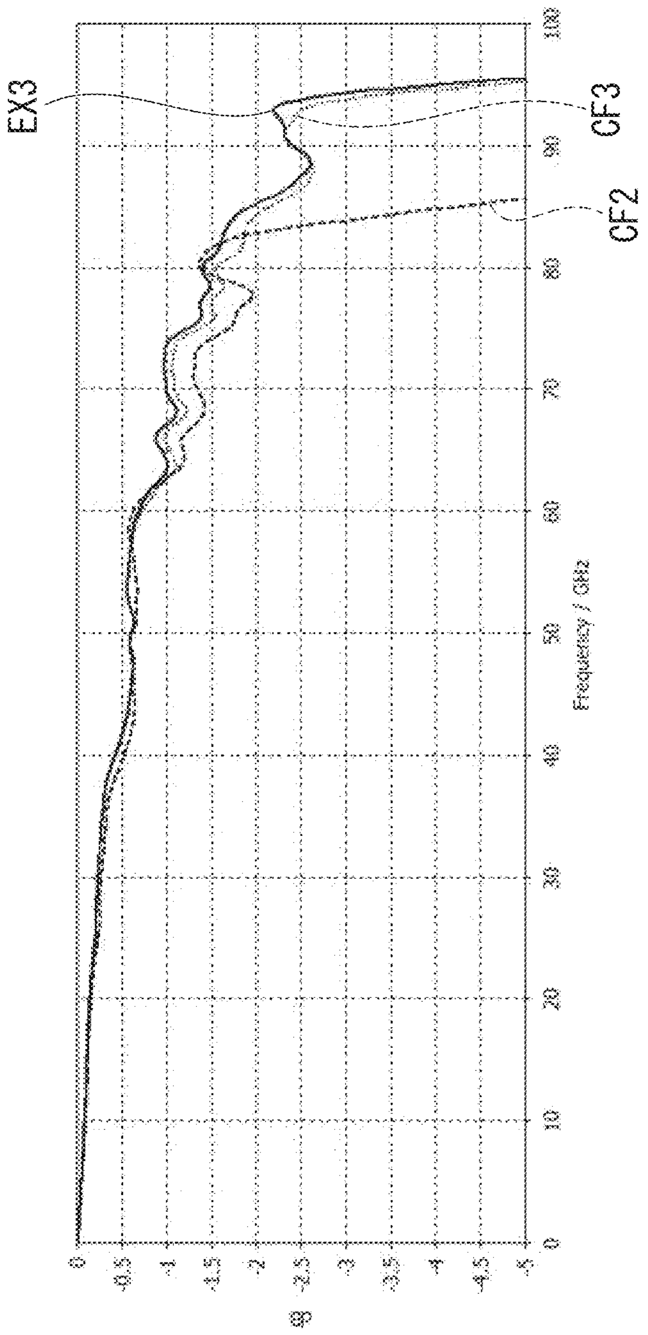
FIG. 25 is a graph illustrating insertion losses.

FIG. 25 illustrates insertion losses of the connector calculated by a simulation. In FIG. 25, the horizontal axis represents the frequency (GHz), and the vertical axis represents the insertion loss (dB). The dashed line CF2 represents Reference example 2 having the through holes 241, 242 of the connector 200 but not having the opening 111*e*1, 141*e*1 of the first embodiment, the dotted line CF3 represents Reference example 3 not having the through holes 241, 242 of the connector 200 but having the opening 111*e*1, 141*e*1 of the first embodiment, and the solid line EX3 represents Example 3 that is the connector 200 of the present embodiment, has the through holes 241, 242 as with FIG. 21, and has the openings 240*e*1 as with the first embodiment.

As can be seen from FIG. 25, in Reference example 2 (dashed line CF2) not having the opening 111*e*1 of the first embodiment (see FIG. 13), a large insertion loss was observed between 80 GHz and 90 GHz. In contrast, in Reference example 3 (dotted line CF3) and Example 3 (solid line EX3), no large insertion loss was observed between 80 GHz and 90 GHz, and the first large insertion loss was observed around 95 GHz.

The insertion loss is smaller in Example 3 (solid line EX3) than in Reference example 3 (dotted line CF3) by about 0.1 to 0.2 dB at frequencies of 65 to 88 GHZ. Furthermore, the insertion loss is slightly smaller in Example 3 (solid line EX3) than in Reference example 3 (dotted line CF3) between 93 and 95 GHz.

Figure 26:
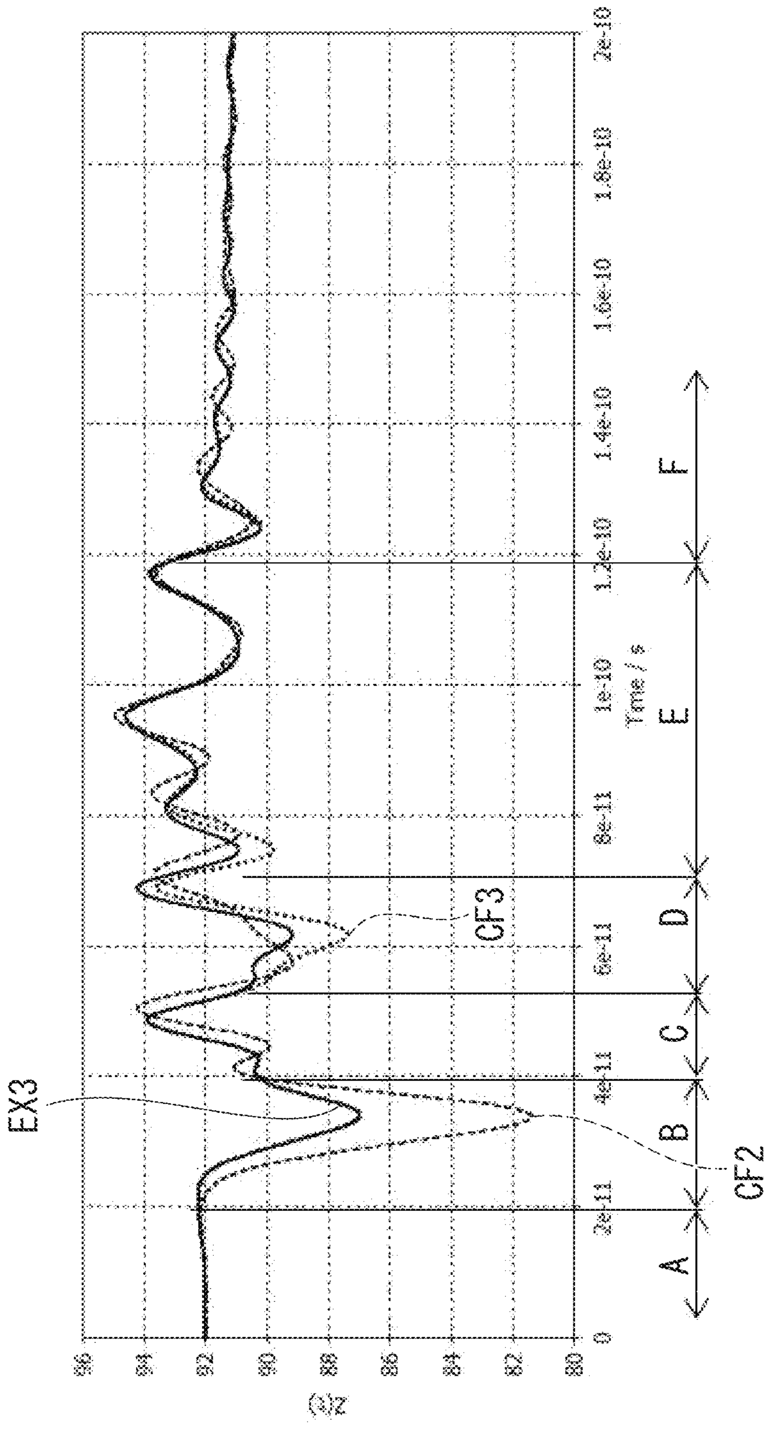
FIG. 26 is a graph illustrating impedance characteristics.
Figure 27:
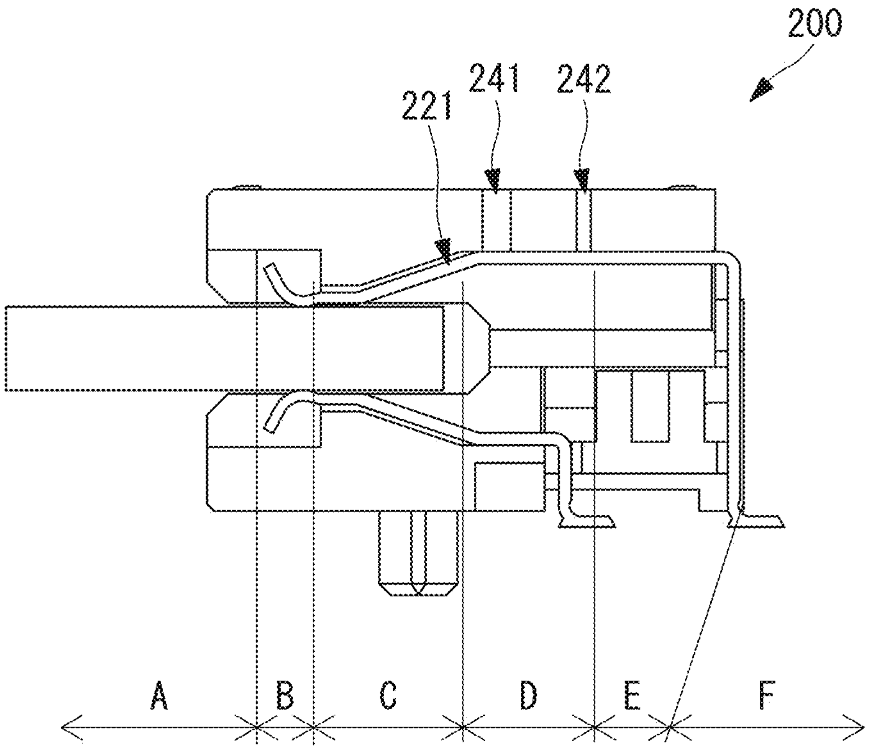
FIG. 27 is a cross sectional view of the connector illustrating respective regions of FIG. 26.

FIG. 26 illustrates a result of a time domain reflectometry (TDR) analysis in which impedance improvement characteristics are calculated by a simulation for examining a cause of the reduction effect on insertion losses illustrated in FIG. 25. In FIG. 26, the horizontal axis represents the time (s), and the vertical axis represents the impedance ((2). The time (s) on the horizontal axis generally corresponds to the electrical length, which has a positional relationship illustrated in FIG. 27. FIG. 27 corresponds to FIG. 21 and illustrates the connector 200 in a state where a substrate is inserted. Reference A represents a region from the inserted substrate side to the contact pin tip, reference B represents a region from the end of the region of reference A to a part around the tip part and the contact part of the contact pin, reference C represents a region from the end of the region of reference B to a spring beam part, reference D represents a region from the end of the region of reference C to the through hole 242, reference E represents a region from the end of the region of reference D to the mount part of the contact pin, and reference F represents a region from the end of the region of reference E to and beyond the mount substrate.

As can be seen from FIG. 26, in the region of reference B, Reference example 2 (dashed line CF2) not having the opening of the first embodiment has a larger reduction in the impedance than Example 3 (solid line EX3) and Reference example 3 (dotted line CF3). This is the same as the simulation result of the first embodiment (see FIG. 16). Thus, such a reduction in impedance mismatch makes it possible to shift the drop of the insertion loss from 85 GHZ (dashed line CF2) to around 95 GHz as seen in FIG. 25.

In the region of reference D, the reduction in the impedance is larger in Reference example 3 (dotted line CF3) not having the through holes 241, 242 of the present embodiment than in Example 3 (solid line EX3) and Reference example 2 (dashed line CF2) having the through holes. Accordingly, improvement in the impedance due to the through holes 241, 242 in the region of reference D was observed. Such a reduction in impedance mismatch leads to prevention of an insertion loss in a frequency region above 65 GHz.

According to the connector 200 of the present embodiment, the following effects and advantages are achieved.

The protruding part 221*e*2 having a large dimension in the width direction of the contact pin 221 has a larger volume of a conductor portion than the main body 221*e*1 having a smaller dimension in the width direction than the protruding part 221*e*2 and thus has a reduced impedance. On the other hand, a portion where the contact pin 221 is in contact with the resin housing 210 has a reduced impedance. Taking advantage of this property, a through hole is provided in a housing to form a space and form a noncontact region, which is not in contact with the resin, in a planar part of the contact pin 221 corresponding to the protruding part 221*e*2 having a large dimension in the width direction, and the planar part of the contact pin 221 is configured to be in contact with the resin housing 210 in a region other than the noncontact region. Accordingly, it is possible to control an impedance change in the longitudinal direction (the insertion-extraction direction Die) of the press-fit part of the contact pin 221 as much as possible.

The narrow-width part 221*e*3 is provided between the protruding part 221*e*2 and the main body 221*e*1 to compensate a reduction in the impedance of the protruding part by using the narrow-width part 221*e*3 having a smaller volume of a conductor than the protruding part 221*e*2. Accordingly, it is possible to control an impedance change of the entire contact pin 221 as much as possible and obtain a desired impedance.

The protruding part 221*e*2 of the signal pin 221(S) is set at a different position in the longitudinal direction (the insertion-extraction direction Die) from the protruding part 221*e*2 of the adjacent ground pin 221(G). In such a way, the positions of the protruding part 221*e*2 are shifted from each other in the longitudinal direction. This can avoid a large change in the spacing between the signal pin 221(S) and the ground pin 221(G) and facilitate adjustment of the impedance.

Third Embodiment

A connector according to a third embodiment of the present invention will be described with reference to the drawings.

Note that the present embodiment can also be applied to the connector 100 of the first embodiment and the connector 200 of the second embodiment.

Figure 28:
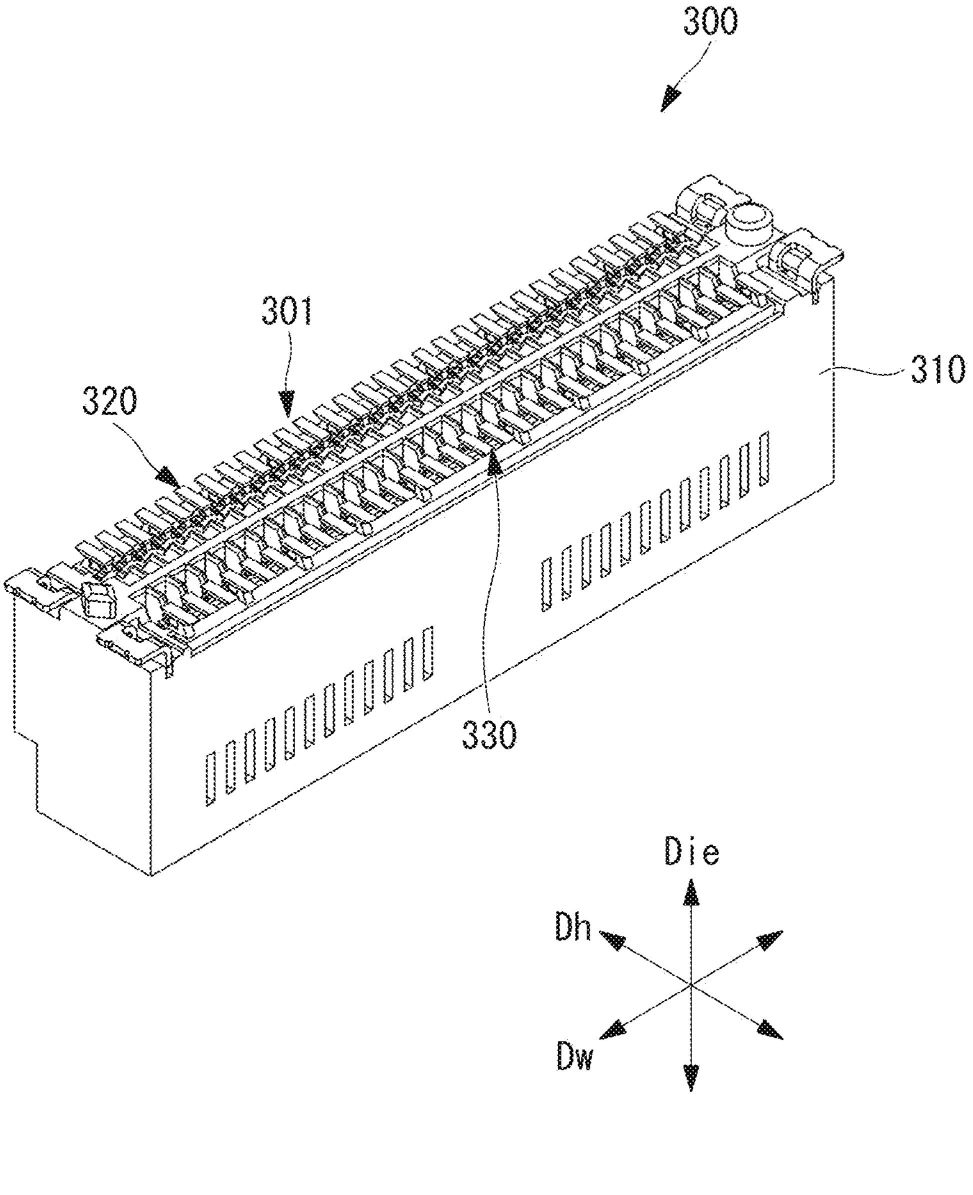
FIG. 28 is a perspective view of a connector according to a third embodiment.

As illustrated in FIG. 28, a connector 300 is a connector that is mounted on a mount substrate (not illustrated) and in which a device is inserted. Thus, the connector 300 is a connector for electrically connecting the mount substrate and the device to each other. The device may be a plug connector having a substrate having electrodes or a plug connector having contact pins as an example. In FIG. 28, the connector 300 is illustrated with a mount part 301 facing upward.

For example, the connector 300 can be used as vertical line card (VLC) structure in which a plug connector is inserted and extracted in a vertical direction to a substrate. The connector 300 includes a housing 310, a first pin group 320, and a second pin group 330.

The housing 310 is a component having substantially a rectangular parallelepiped external shape and accommodates and holds the first pin group 320 and the second pin group 330. The housing 310 is a nonconductive member and is molded with a resin or the like, for example.

Figure 29:
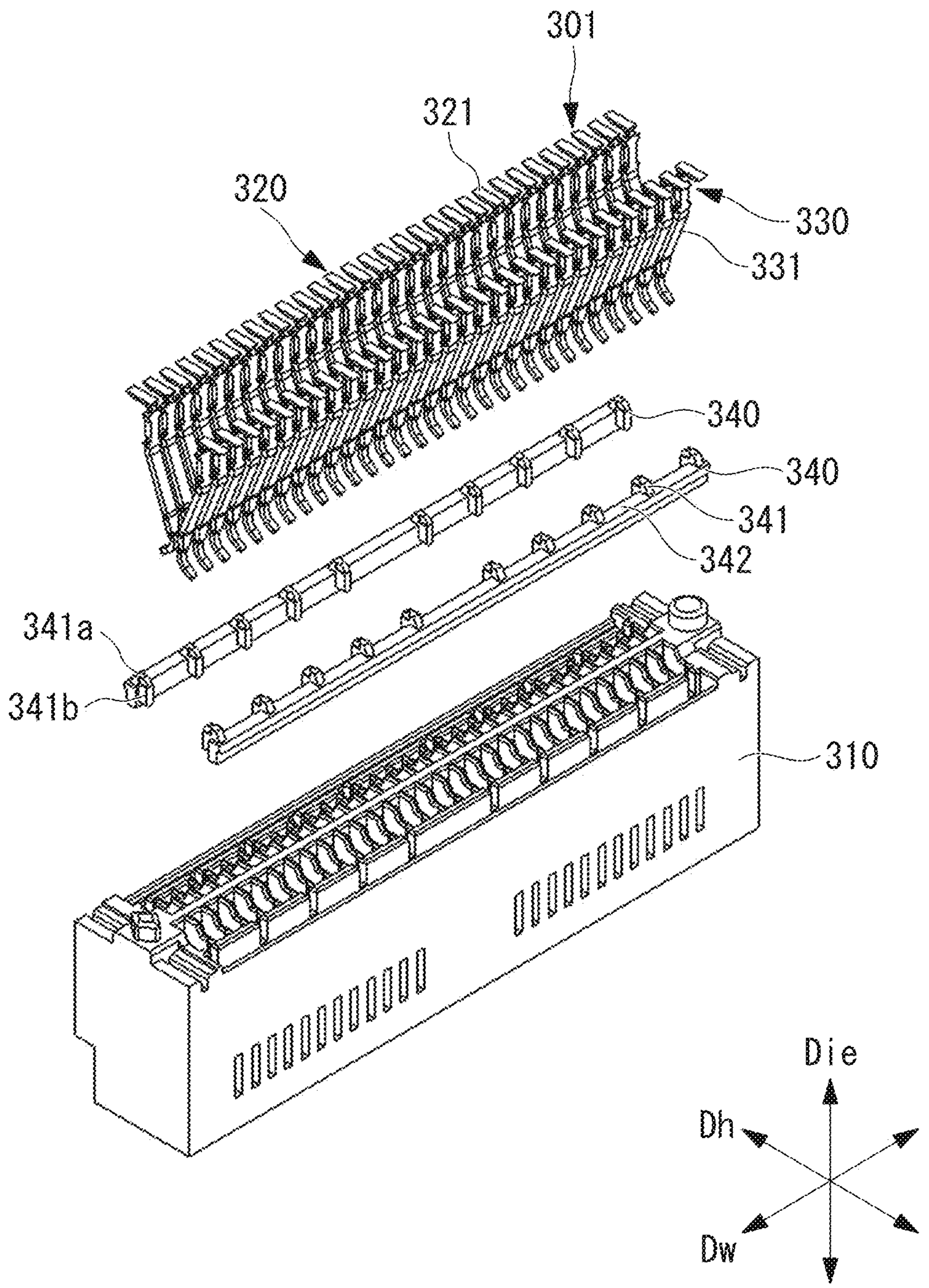
FIG. 29 is an exploded perspective view of the connector of FIG. 28.

FIG. 29 illustrates an exploded perspective view of the connector 300. As illustrated in FIG. 29, conductive members 340 are provided between the housing 310 and the first pin group 320 and between the housing 310 and the second pin group 330. A single conductive member 340 is provided in each of the pin groups 320, 330. Each conductive member 340 is a bar-like shape and extends in the aligning direction of each contact pin 321, 331 of each pin group 320, 330. As a material of the conductive member, a conductive resin may be used, for example. The conductive resin has a predetermined electrical conductivity and is molded with a resin in which conductive particles are dispersed, an anti-static resin, or the like, for example. The "predetermined electrical conductivity" as used herein is, for example, 10 S/m or higher and 200 S/m or lower, preferably, 30 S/m or higher and 150 S/m or lower.

The conductive member 340 has a plurality of protrusion parts 341 at predetermined spacings in the longitudinal direction. Each protrusion part 341 includes a first protrusion part 341*a* and a second protrusion part 341*b*. The first protrusion part 341*a* protrudes from a main body 342 so as to face the mount part 301 side of the contact pins 321, 331. The second protrusion part 341*b* protrudes so as to face base end parts 321*b*, 331*b* (see FIG. 32) of the contact pins 321, 331.

Figure 30:
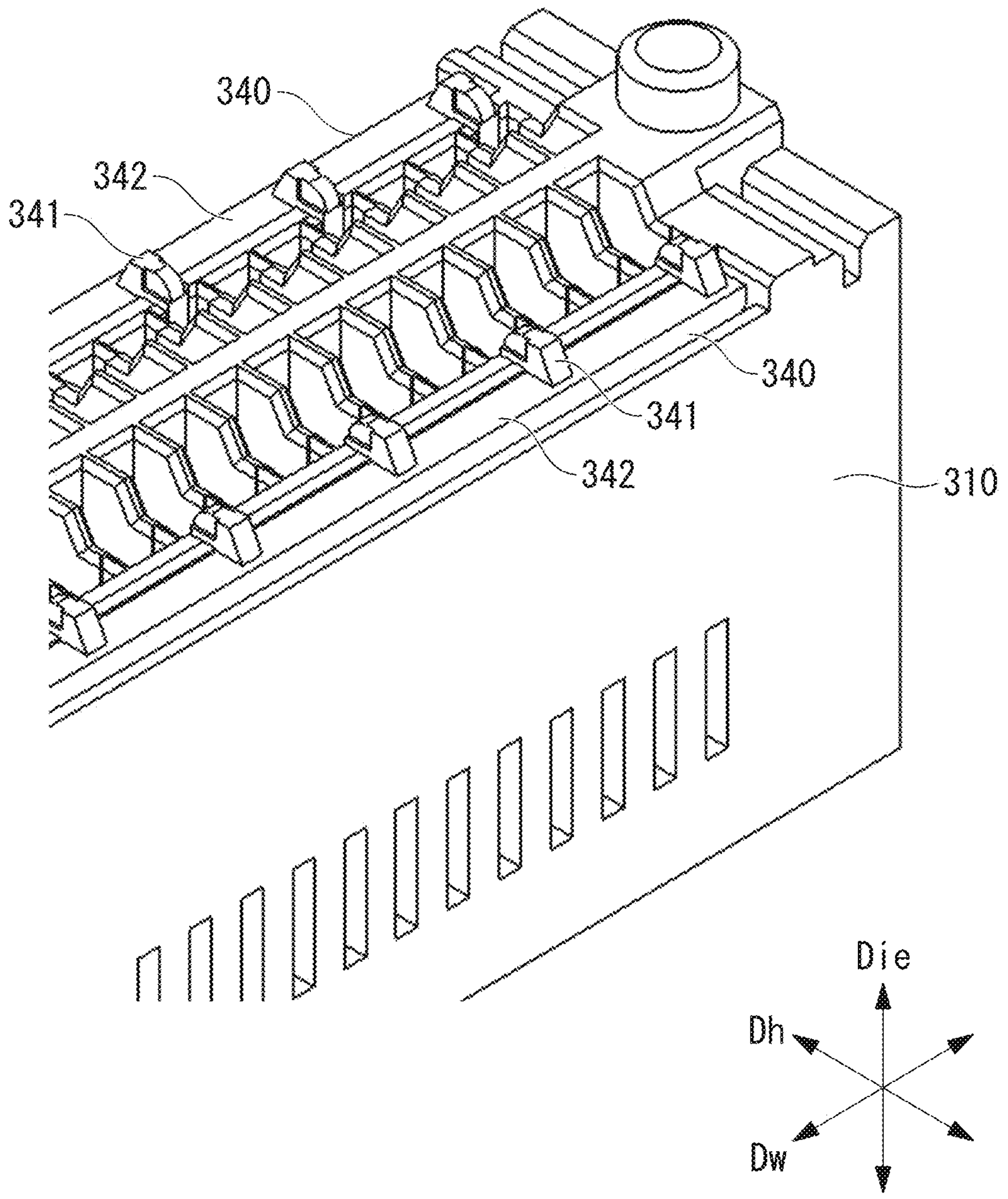
FIG. 30 is a partially enlarged perspective view illustrating a state where a conductive member is assembled to a housing.

FIG. 30 illustrates a state where the conductive members 340 have been assembled to the housing 310. In this state, the contact pins 321, 331 have not yet been assembled.

Figure 31:
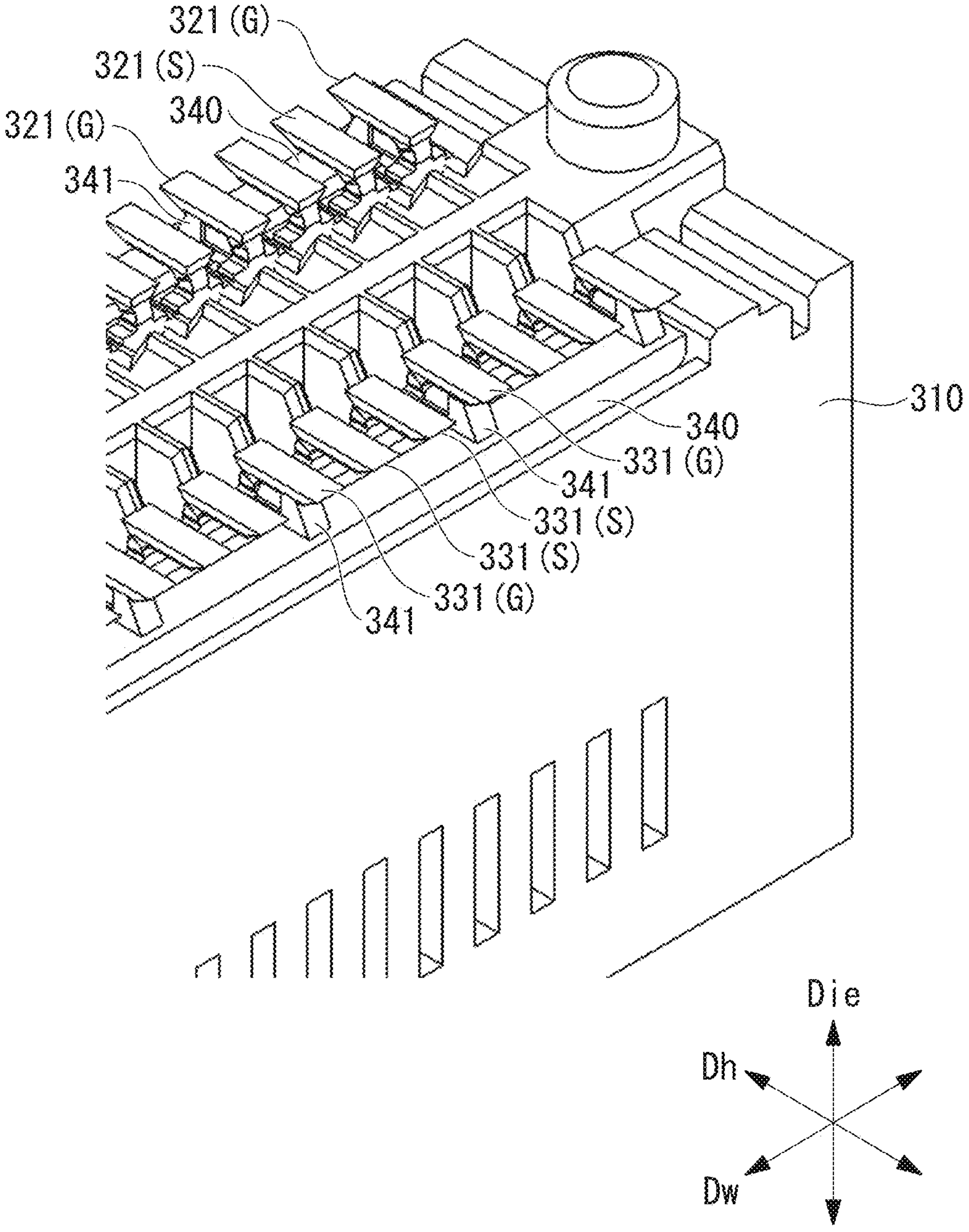
FIG. 31 is a partially enlarged perspective view illustrating a state where contact pins are assembled to FIG. 30.

FIG. 31 illustrates a state where the contact pins 321, 331 are assembled on the conductive members 340 illustrated in FIG. 30. As can be seen from FIG. 31, the protrusion parts 341 of the conductive members 340 are provided at positions corresponding to the ground pin 321(G), 331(G) of the contact pins 321, 331. Therefore, the conductive members 340 are in electrical contact with only the ground pins 321(G), 331(G) and not in electrical contact with the signal pins 321(S), 331(S). However, the protrusion parts 341 can be arranged at a distance to the ground pins 321(G), 331(G) so that high-frequency waves above 1 GHz can be electrically connected therebetween. Typically, a gap up to about 0.05 mm to 0.1 mm is tolerated for the distance between the protrusion part 341 and the ground pins 321(G), 331(G).

Figure 32:
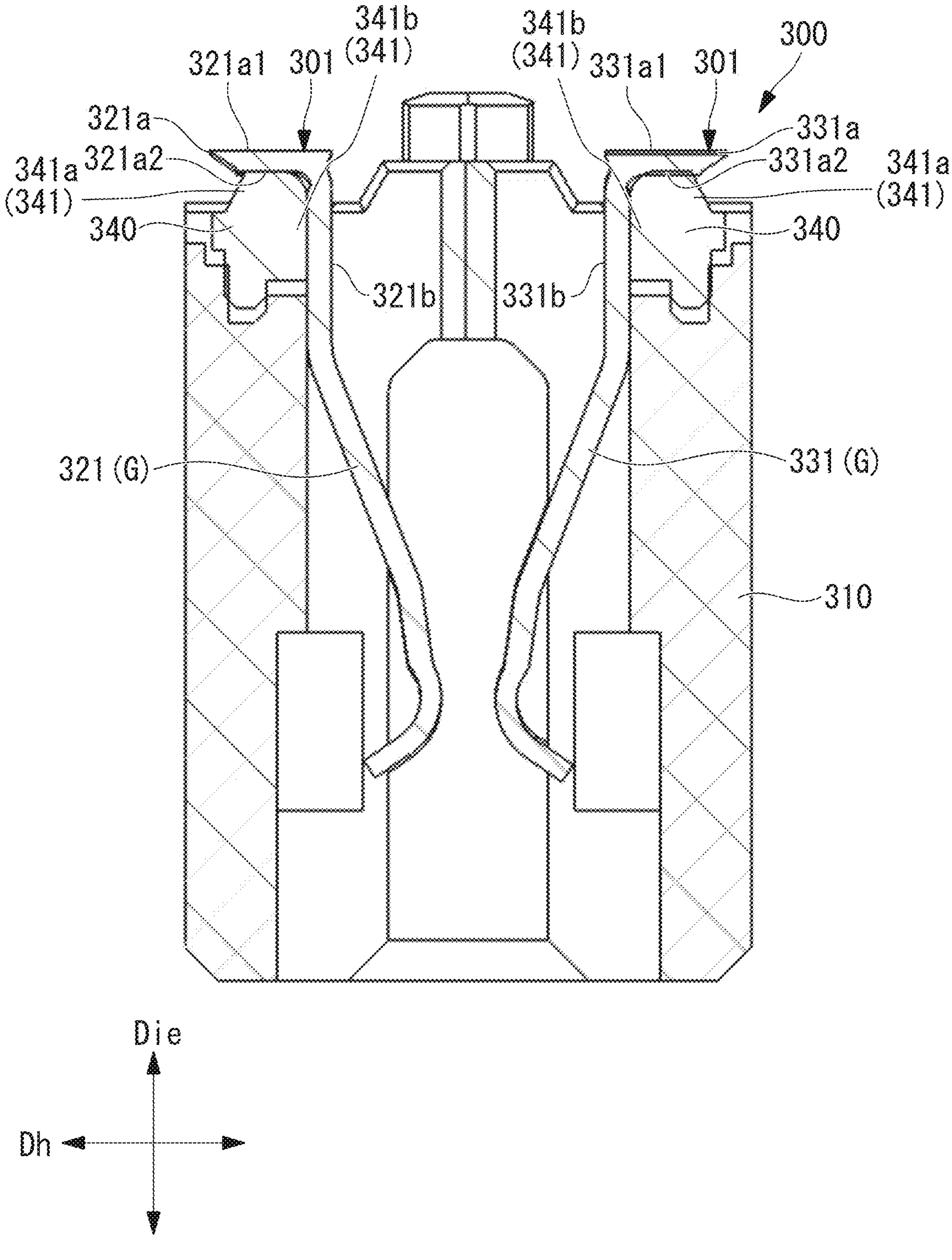
FIG. 32 is a cross sectional view of the connector of FIG. 28 cut at a position where ground pins are viewed.

As illustrated in FIG. 32, the conductive members 340 are in electrical contact with substrate fixing parts 321*a*, 331*a* that serve as the mount parts 301 of the ground pins 321(G), 331(G). The substrate fixing parts 321*a*, 331*a* are bent at substantially a right angle relative to the base end parts 321*b*, 331*b* extending in the insertion-extraction direction of the connector 300 (the vertical direction in FIG. 32) and also extend in the outward direction of the connector 300 so as to be along the plane direction of the mount substrate.

The substrate fixing parts 321*a*, 331*a* have fixing faces 321*a*1, 331*a*1 fixed to the mount substrate (not illustrated) by soldering or the like and back faces 321*a*2, 331*a*2 on the opposite side in the plate-thickness direction of the substrate fixing parts 321*a*, 331*a* to the fixing faces 321*a*1, 331*a*1. Assembly is made such that the upper faces of the protrusion parts 341 of the conductive members 340 are in electrical contact with the back faces 321*a*2, 331*a*2. Thus, the conductive members 340 are secured in a recess formed by the substrate fixing parts 321*a*, 331*a*, the housing 310, and the base end parts 321*b*, 331*b*. Further, the conductive members 340 are in a state of being held between the back faces 321*a*2, 331*a*2 of the substrate fixing parts 321*a*, 331*a* and the housing 310.

According to the connector 300 of the present embodiment, the following effects and advantages are achieved.

The conductive member 340 can absorb noise by being in electrical contact with each of the ground pins 321(G), 331(G) of the contact pins 321, 331. Each conductive member 340 is provided so as to be held between each of the back faces 321*a*2, 331*a*2 of the substrate fixing parts 321*a*, 331*a* of the ground pins 321(G), 331(G) and the housing 310. This allows for effective utilization of a region on the back face 321*a*2, 331*a*2 side of the substrate fixing parts 321*a*, 331*a* of the ground pins 321(G), 331(G), and the connector 300 can be made compact. Furthermore, it is possible to prevent the conductive member 340 from falling out of the housing 310.

By having the first protrusion parts 341*a* erected from the main body 342 of the conductive member 340 toward the ground pin 321(G), 331(G), contact of the conductive member 340 with the signal pin 321(S), 331(S) can be reliably avoided.

The second protrusion parts 341*b* are provided so as to be erected from the main body 342 of the conductive member 340 toward the base end parts 321*b*, 331*b* of the ground pins 321(G), 331(G). This further allows for a wider area of electrical contact with the ground pins 321(G), 331(G) and therefore enables effective noise absorbance.

Fourth Embodiment

A connector according to a fourth embodiment of the present invention will be described with reference to the drawings.

Note that the present embodiment can also be applied to the connector 100 of the first embodiment, the connector 200 of the second embodiment, and the connector 300 of the third embodiment.

Figure 33:
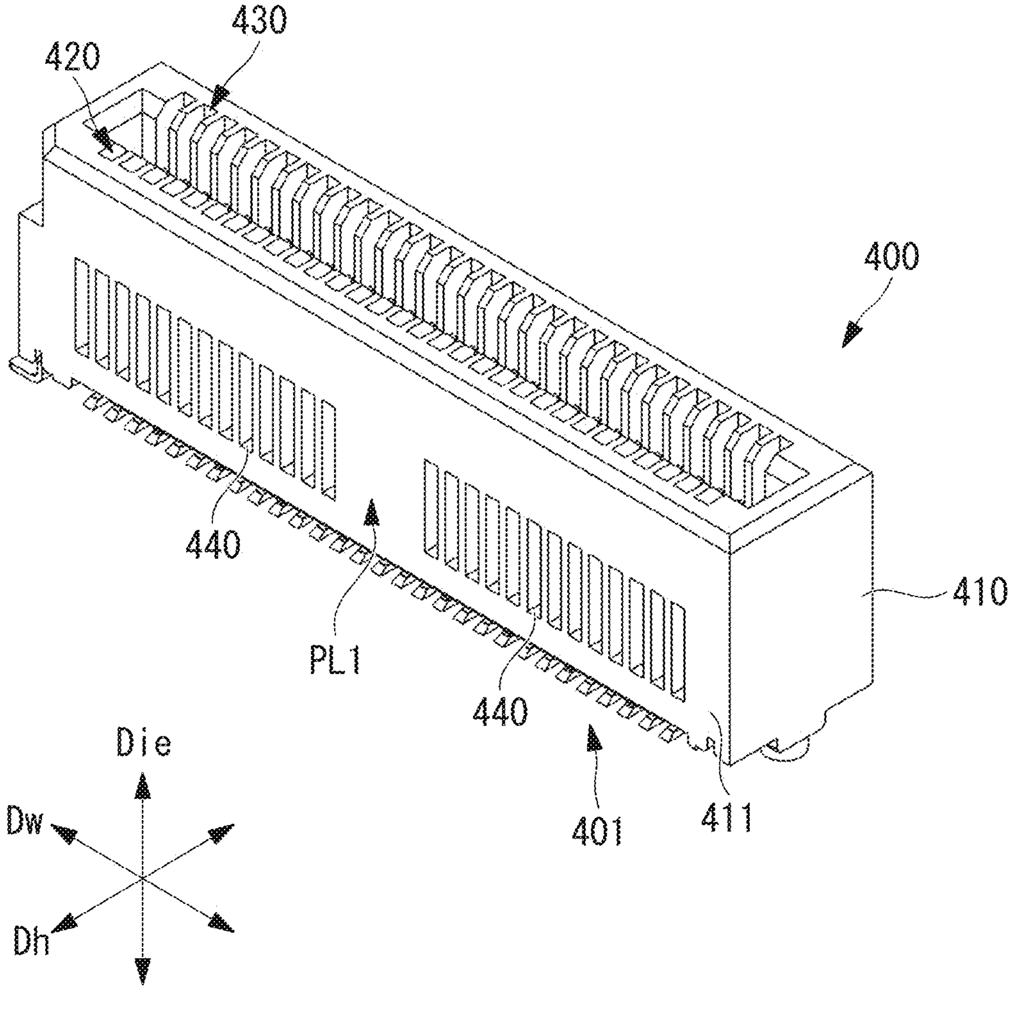
FIG. 33 is a perspective view of a connector according to a fourth embodiment.

As illustrated in FIG. 33, a connector 400 is a connector that is mounted on a mount substrate (not illustrated) and in which a device is inserted. Thus, the connector 400 is a connector for electrically connecting the mount substrate and the device to each other. The device may be a plug connector having a substrate having electrodes or a plug connector having contact pins as an example. In FIG. 33, the connector 400 is illustrated with a mount part 401 facing downward.

For example, the connector 400 can be used as vertical line card (VLC) structure in which a plug connector is inserted and extracted in a vertical direction to a substrate. The connector 400 includes a housing 410, a first pin group 420, and a second pin group 430.

The housing 410 is a component having substantially a rectangular parallelepiped external shape and accommodates and holds the first pin group 420 and the second pin group 430. The housing 410 is a nonconductive member and is molded with a resin or the like, for example.

Figure 34:
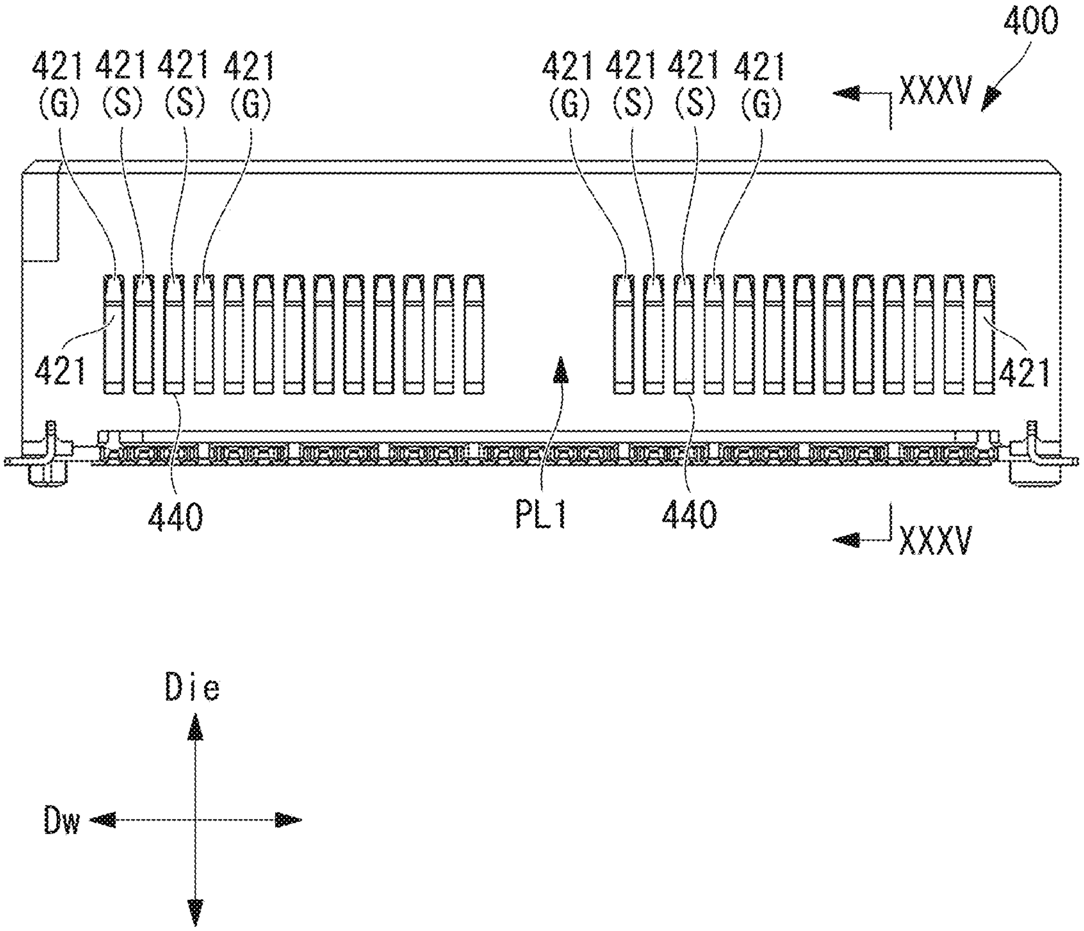
FIG. 34 is a front view of the connector of FIG. 33.

A plurality of slits 440 having the same shape are formed in a side wall 411 extending in the longitudinal direction (width direction Dw) of the housing 410. As illustrated in FIG. 34, each slit 440 has a rectangular cross section extending in the longitudinal direction (insertion-extraction direction Die) of each of contact pins 421, 431 forming the pin groups 420, 430. Each single slit 440 is provided at a position corresponding to each of the signal pins 421(S), 431(S) configured to transmit a high frequency signal. Furthermore, each single slit 440 is provided at a position corresponding to each of the ground pins 421(G), 431(G) to be grounded. However, the slit 440 is not provided at a position PL1 corresponding to other functions such as a power supply pin used for supplying power.

Figure 35:
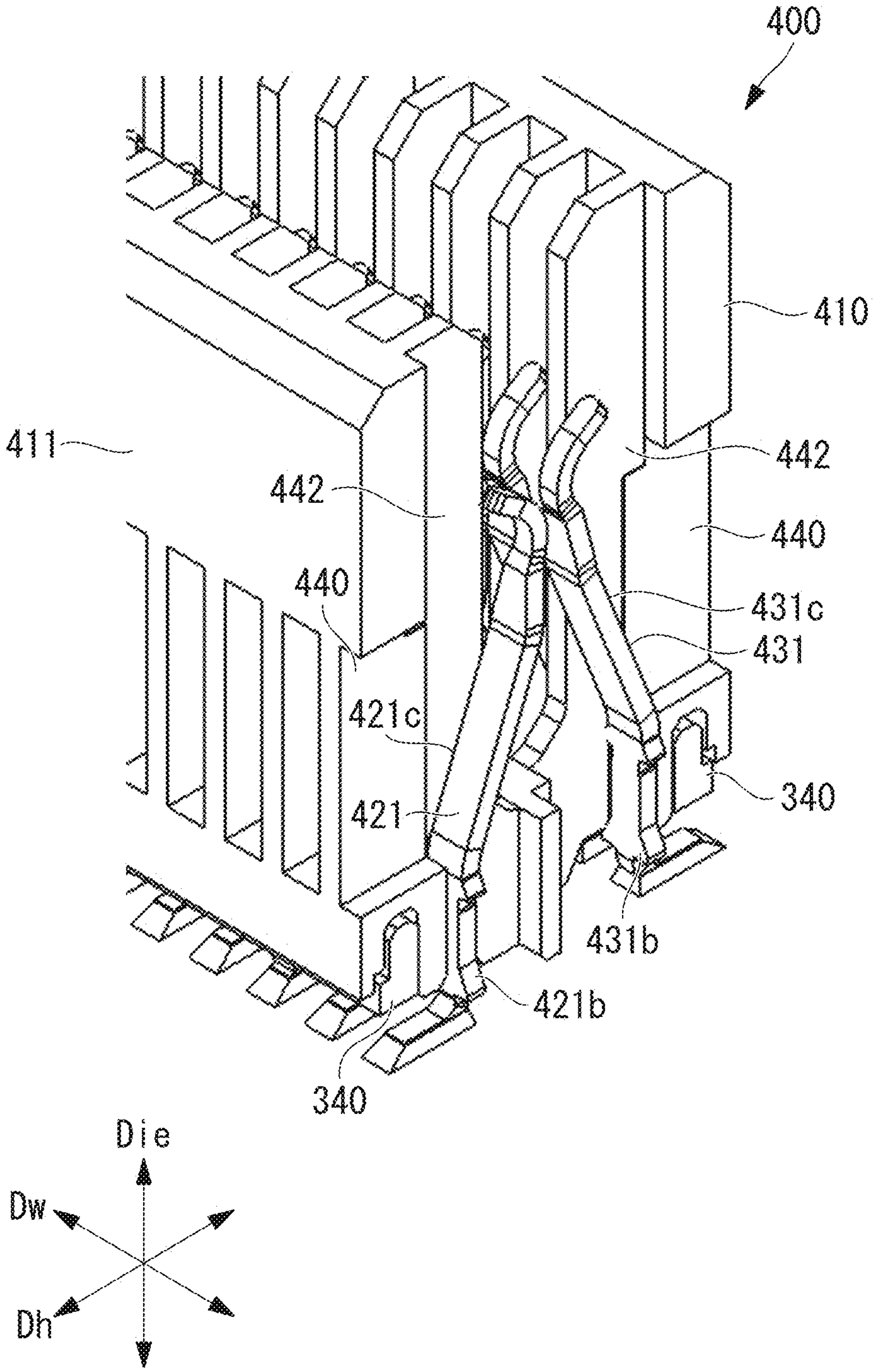
FIG. 35 is a partially enlarged sectional perspective view taken along a cutting-plane line XXXV-XXXV of FIG. 34.
Figure 36:
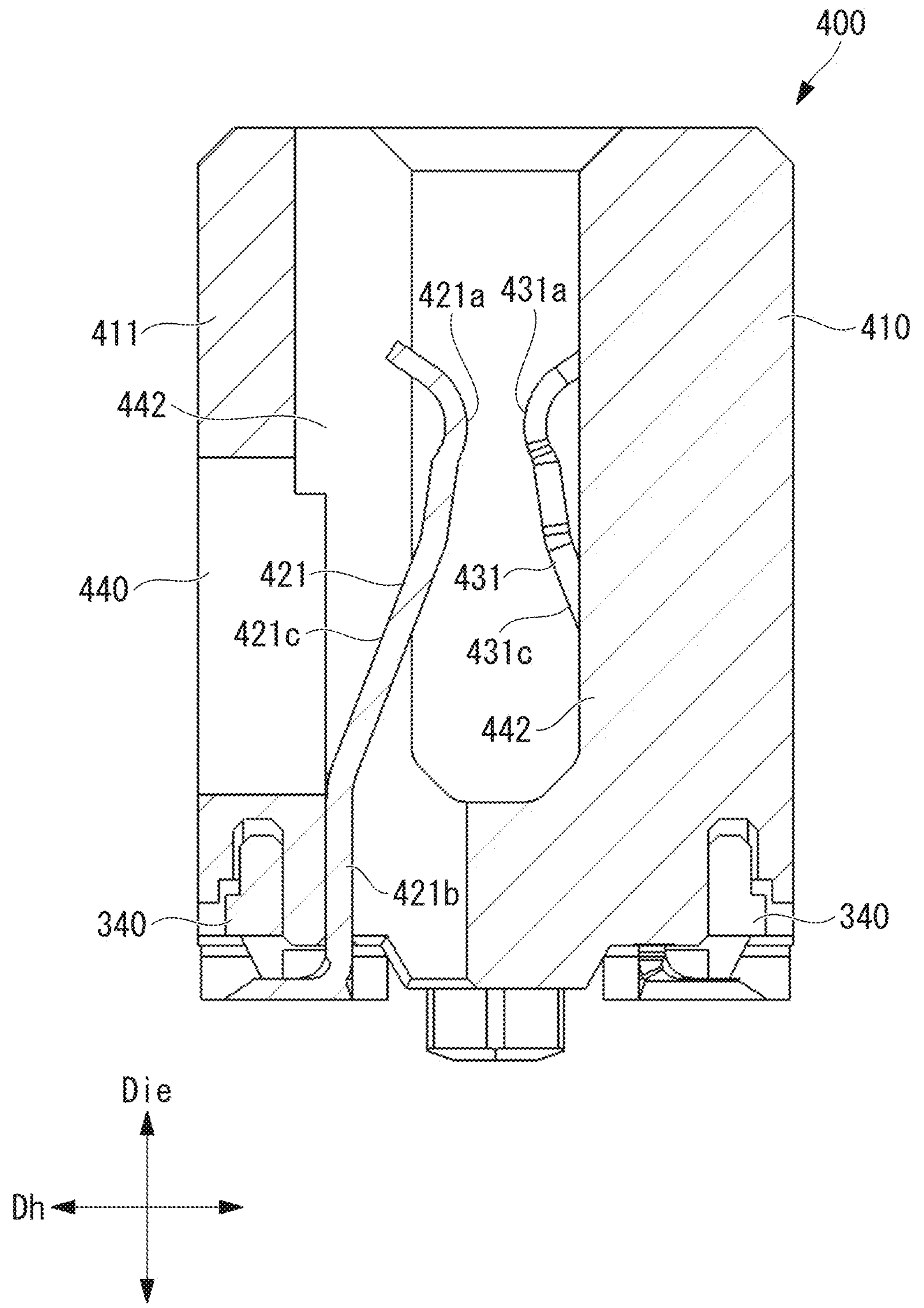
FIG. 36 is a cross sectional view taken along the cutting-plane line XXXV-XXXV of FIG. 34.

As illustrated in FIG. 35 and FIG. 36, the slits 440 are formed so as to penetrate the side wall 411 in the thickness direction thereof. The contact pins 421, 431 each have a shape formed such that an elongate plate-like member extending in the longitudinal direction is bent at a plurality of points in the same manner as in each embodiment described above. The contact pins 421, 431 have contact parts 421*a*, 431*a* in contact with electrodes of a device to be connected, press-fit parts 421*b*, 431*b* press-fitted and fixed to the housing 410, and intermediate parts 421*c*, 431*c* located between the contact parts 421*a*, 431*a* and the press-fit parts 421*b*, 431*b*. The intermediate parts 421*c*, 431*c* are each substantially straight and inclined from outside to inside of the housing 410, which are portions elastically deformed by insertion and extraction of the device. Further, the intermediate parts 421*c*, 431*c* each have a function of a spring part elastically deformed by insertion and extraction of the device with the press-fit parts 421*b*, 431*b* serving as fulcrums.

The slits 440 are formed at positions corresponding to the intermediate parts 421*c*, 431*c*. Accordingly, as illustrated in FIG. 34, the intermediate parts 421*c*, 431*c* are visible from outside of the housing 410. Note that, as illustrated in FIG. 35 and FIG. 36, reference 442 represents partition walls that partition the contact pins 421, 431 from each other. Reference 340 represents the conductive member (FIG. 29 and the like) described in the third embodiment.

According to the present embodiment, the following effects and advantages are achieved.

The slits 440 opened to outside of the housing 410 are formed at positions corresponding to the intermediate parts 421*c*, 431*c* of the contact pins 421, 431 to the housing 410, and thereby crosstalk during transmission of a high-speed signal above 100 Gbps can be improved.

Note that the present embodiment can be modified as follows.

Figure 37:
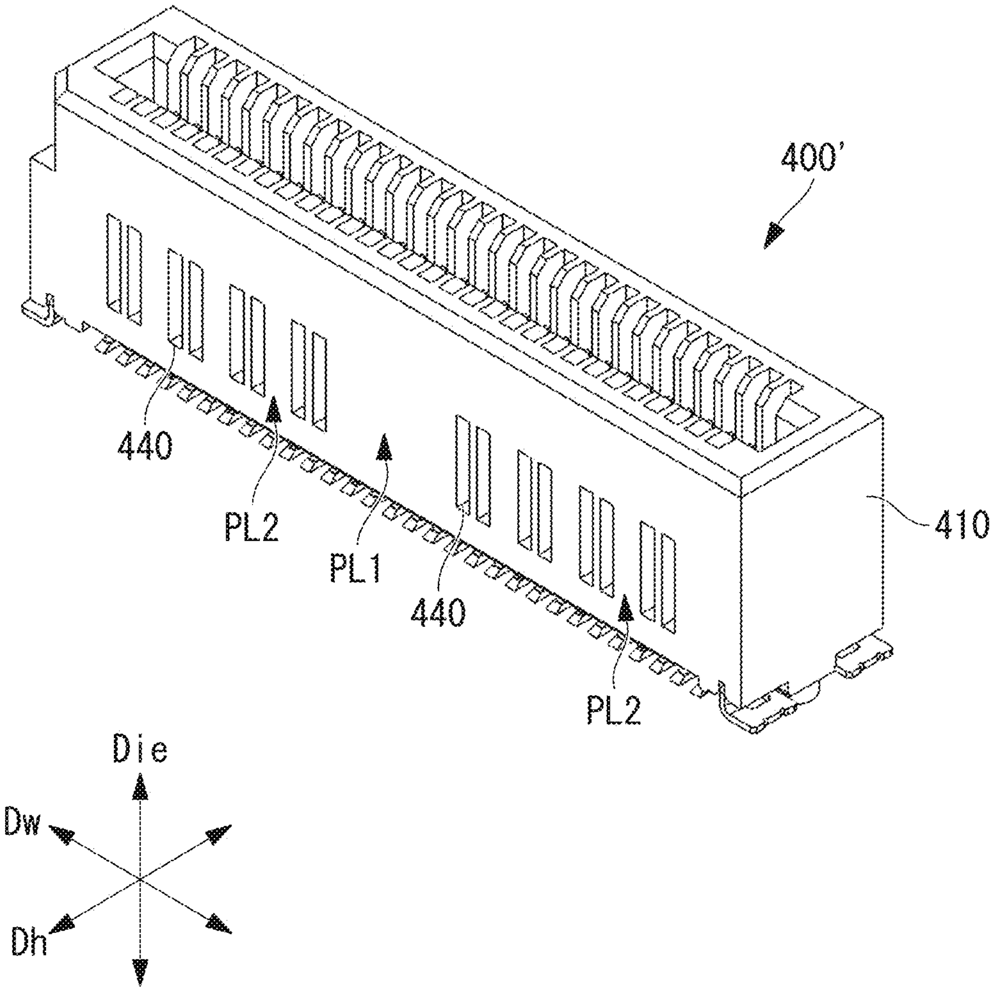
FIG. 37 is a perspective view illustrating a modified example of the connector of FIG. 33.
Figure 38:
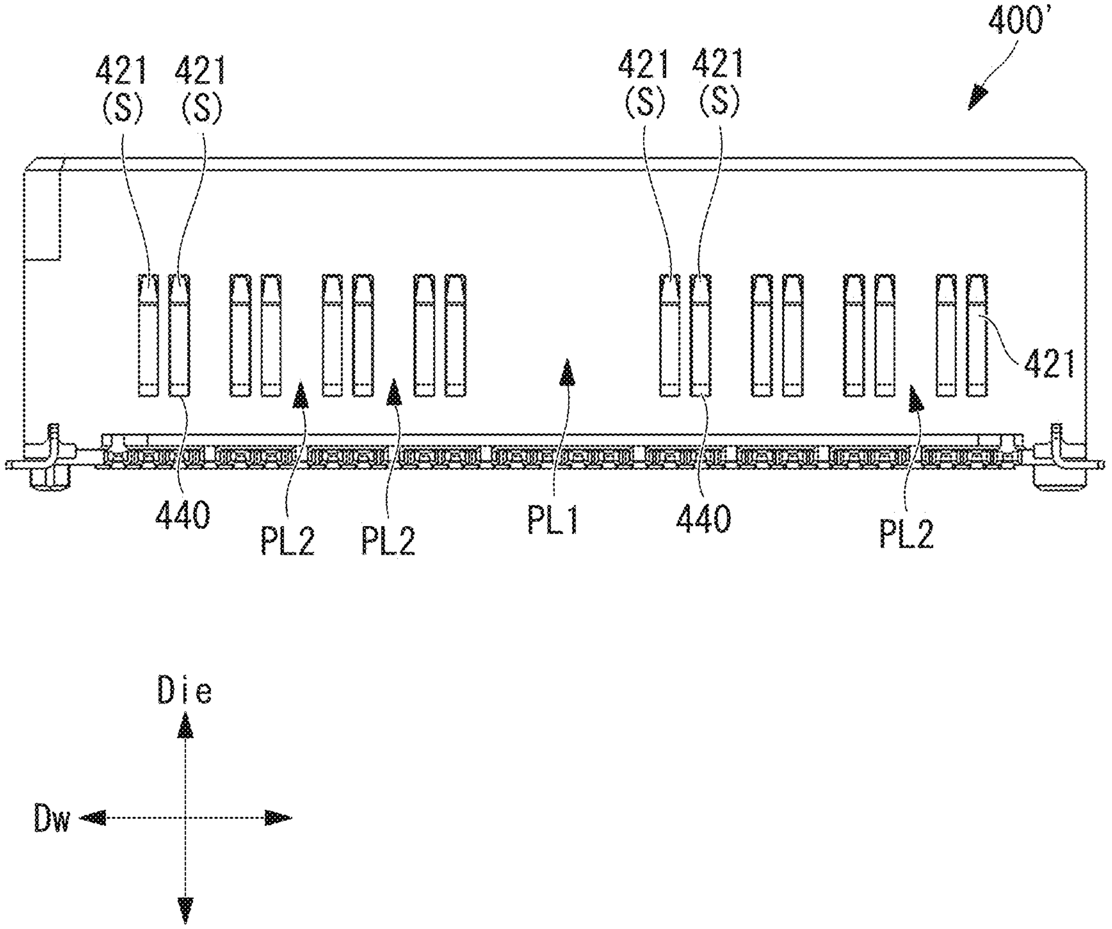
FIG. 38 is a front view of the connector of FIG. 37.

As illustrated in FIG. 37 and FIG. 38, while each single slit 440 of a connector 400' is provided at respective positions corresponding to the signal pins 421(S), 431(S), the slit 440 is not provided at positions PL2 corresponding to the ground pins 421(G), 431(G). Even with such a modified example, crosstalk can be improved.

Figure 39:
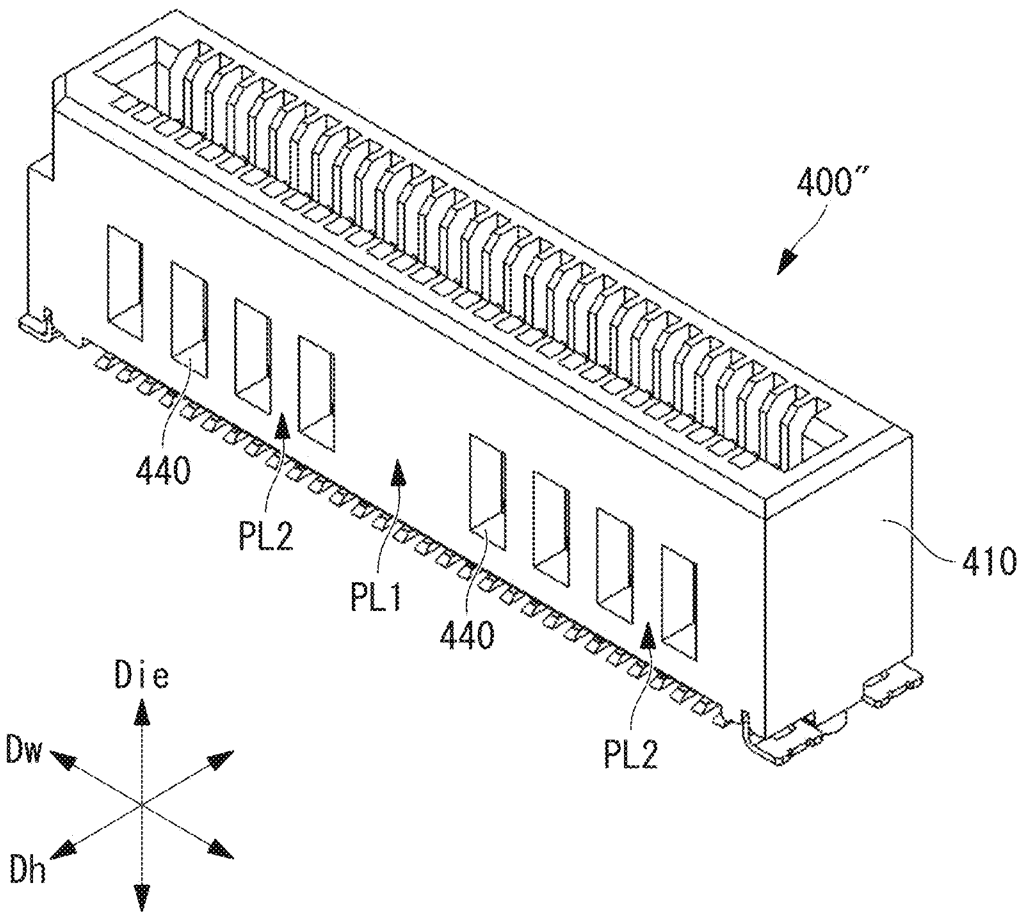
FIG. 39 is a perspective view illustrating another modified example of the connector of FIG. 33.
Figure 40:
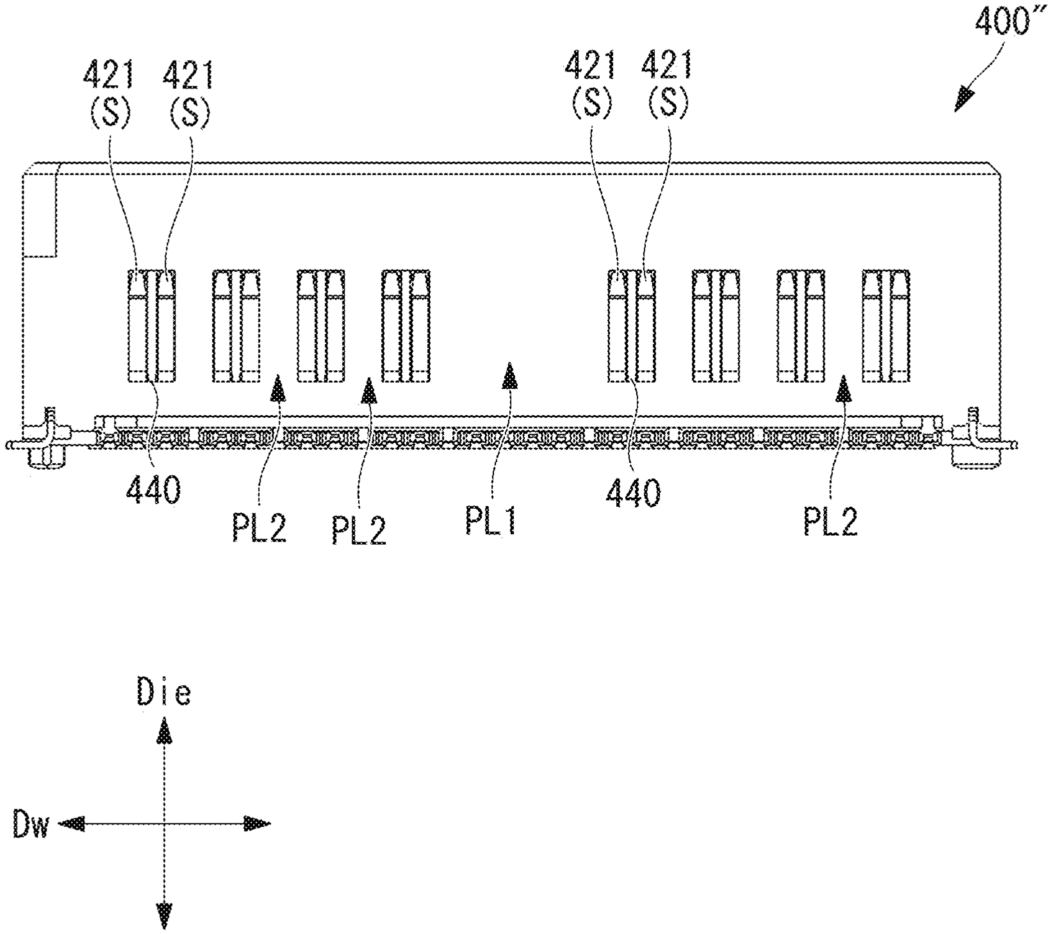
FIG. 40 is a front view of the connector of FIG. 39.

Further, as illustrated in FIG. 39 and FIG. 40, each single slit 440 of the connector 400" is provided at each position corresponding to a pair of adjacent signal pins 421(S), 431(S). Even with such a modified example, crosstalk can be improved.

What is claimed is:

1. A connector comprising:

a mount part mounted on an external substrate;

an insertion-extraction part in and from which an external device is inserted and extracted in an insertion-extraction direction;

a pin group in which a plurality of contact pins configured to be in electrical contact with electrodes of the device are aligned;

a housing that holds the pin group; and a partition wall that partitions adjacent contact pins from each other, wherein each of the contact pins has a fixing part located on a mount part side and fixed to the substrate, a tip part located on an insertion-extraction part side and serving as a free end, and a contact part provided between the fixing part and the tip part and configured to be in electrical contact with each of the electrodes of the device, and wherein in a state where the contact part is in contact with each of the electrodes of the device, adjacent tip parts are located via a space where the partition wall is absent.

2. The connector according to claim 1, wherein the space is formed of an opening formed in the partition wall.

3. The connector according to claim 2, wherein the partition wall comprises a connecting part provided such that a wall end part serving as a free end of the partition wall is formed continuously in a longitudinal direction, and wherein a perimeter of the opening is closed by the connecting part.

4. The connector according to claim 1, wherein a transmission rate is 100 Gbps or higher.

5. A connector comprising:

a mount part mounted on an external substrate;

an insertion-extraction part in and from which an external device is inserted and extracted in an insertion-extraction direction;

a pin group in which a plurality of contact pins configured to be in electrical contact with electrodes of the device are aligned; and a resin housing that holds the pin group, wherein each of the contact pins has a press-fit part, the press-fit part having a shape formed such that an elongate plate-like member extending in a longitudinal direction is bent at a plurality of points, and the press-fit part being press-fitted into and secured in the housing, wherein the press-fit part has a protruding part, the protruding part protruding from a main body of the press-fit part outwardly in a width direction orthogonal to a plate-thickness direction and the longitudinal direction of the contact pins, the protruding part being in contact with and press-fitted into the housing, wherein in the housing, a space is formed so as to form a noncontact region in which a planar part in the width direction of the press-fit part is not in contact with the housing at a position corresponding to the protruding part, and wherein the planar part of the press-fit part is in contact with the housing in a region other than the noncontact region.

6. The connector according to claim 5, wherein the pin group comprises a first pin group and a second pin group facing the first pin group, wherein the press-fit part of each of the contact pins of the first pin group has a larger dimension in the longitudinal direction than the press-fit part of each of the contact pins of the second pin group, and wherein the noncontact region is provided at a position corresponding to the protruding part of the press-fit part of the first pin group.

7. The connector according to claim 5, wherein each of the contact pins comprises, between the protruding part and the main body, a narrow-width part having a smaller dimension in the width direction than the protruding part and the main body.

8. The connector according to claim 5, wherein the contact pins comprise a signal pin configured to transmit a signal and a ground pin to be grounded, and wherein a position of the protruding part of the signal pin is a position that differs in the longitudinal direction from a position of the protruding part of the ground pin adjacent to the signal pin.

9. A connector comprising:

a mount part mounted on an external substrate;

an insertion-extraction part in and from which an external device is inserted and extracted in an insertion-extraction direction;

a pin group in which a plurality of contact pins configured to be in electrical contact with electrodes of the device are aligned;

a housing that holds the pin group; and a conductive member being in electrical contact with ground pins to be grounded of the contact pins of the pin group and extending in an alignment direction of the contact pins of the pin group, wherein each of the ground pins comprises, as the mount part, a substrate fixing part to be fixed to the substrate, wherein the substrate fixing part has a fixing face to be fixed to the substrate and a back face on an opposite side in a plate-thickness direction to the fixing face, and wherein the conductive member is held between the back face of the ground pins and the housing.

10. The connector according to claim 9, wherein the conductive member comprises a main body and a first protrusion part erected from the main body toward the substrate fixing part of the ground pins and being in electrical contact with the back face.

11. The connector according to claim 10, wherein each of the ground pins has a base end part bent and connected to the substrate fixing part, and wherein the conductive member comprises a second protrusion part erected toward a base end part side and being in electrical contact with the base end part.

12. A connector comprising:

a mount part mounted on an external substrate;

an insertion-extraction part in and from which an external device is inserted and extracted in an insertion-extraction direction;

a pin group in which a plurality of contact pins configured to be in electrical contact with electrodes of the device are aligned; and a housing that holds the pin group, wherein each of the contact pins has a press-fit part, a contact part, and an intermediate part located between the press-fit part and the contact part, the press-fit part having a shape formed such that an elongate plate-like member extending in a longitudinal direction is bent at a plurality of points, the press-fit part being press-fitted into and secured in the housing, and the contact part being located on an insertion-extraction part side and configured to be in electrical contact with the electrodes of the device, and wherein in the housing, slits opened to outside of the housing are each formed at a position corresponding to the intermediate part.

13. The connector according to claim 12, wherein the contact pins comprise a signal pin configured to transmit a signal and a ground pin to be grounded, and wherein one slit is provided at each of positions corresponding to the signal pin and the ground pin.

14. The connector according to claim 12, wherein the contact pins comprise a signal pin configured to transmit a signal and a ground pin to be grounded, and wherein one slit is provided at each of positions corresponding to the signal pin and no slit is formed at a position corresponding to the ground pin.

15. The connector according to claim 12, wherein the contact pins comprise signal pins configured to transmit signals and ground pins to be grounded and are aligned such that one ground pin is arranged each on both sides of a pair of adjacent two signal pins in parallel, and wherein one slit is provided at a position corresponding to the two signal pins.

* * * * *